US012117899B2

(12) United States Patent
Choi

(10) Patent No.: US 12,117,899 B2
(45) Date of Patent: Oct. 15, 2024

(54) SEMICONDUCTOR SYSTEM

(71) Applicant: SK hynix Inc., Gyeonggi-do (KR)

(72) Inventor: Won Ha Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/098,110

(22) Filed: Jan. 18, 2023

(65) Prior Publication Data

US 2024/0160523 A1 May 16, 2024

(30) Foreign Application Priority Data

Nov. 15, 2022 (KR) ........................ 10-2022-0152970

(51) Int. Cl.
*G06F 11/10* (2006.01)
*G06F 12/02* (2006.01)

(52) U.S. Cl.
CPC ........ *G06F 11/1044* (2013.01); *G06F 12/023* (2013.01); *G06F 2212/251* (2013.01)

(58) Field of Classification Search
CPC ............... G06F 11/1044; G06F 12/023; G06F 2212/251
See application file for complete search history.

(56) References Cited

U.S. PATENT DOCUMENTS

| | | | | |
|---|---|---|---|---|
| 2009/0063923 A1* | 3/2009 | Gower | ................ | G06F 11/1076 714/746 |
| 2010/0269021 A1* | 10/2010 | Gower | .................... | G06F 11/10 714/764 |
| 2011/0252171 A1 | 10/2011 | Dearth et al. | | |
| 2020/0371927 A1* | 11/2020 | Chachad | ............. | G06F 12/0828 |

FOREIGN PATENT DOCUMENTS

KR 10-2014-0126225 A 10/2014

* cited by examiner

*Primary Examiner* — Samir W Rizk
(74) *Attorney, Agent, or Firm* — IP & T GROUP LLP

(57) ABSTRACT

A semiconductor system includes a controller configured to output a command and multiple addresses for performing a read modify write operation when the multiple addresses for performing a read operation have a logic level combination for selecting contiguous regions and configured to output first data for performing a write operation, and a semiconductor device configured to store the first data for performing the write operation as write data based on the command, configured to output internal data from a core circuit as the read operation is consecutively performed based on the command and the addresses, configured to generate parities by performing an error correction code (ECC) operation based on the internal data and the write data, and configured to store the write data and the parities in the core circuit.

25 Claims, 15 Drawing Sheets

SEMICONDUCTOR SYSTEM

CROSS-REFERENCE TO RELATED APPLICATION

The present application claims priority under 35 U.S.C. § 119(a) to Korean application number 10-2022-0152970, filed on Nov. 15, 2022, the entire disclosure of which is incorporated herein by reference.

BACKGROUND

Various embodiments of the present disclosure relate to a semiconductor system capable of performing a read modify write operation of performing consecutive read operations and write operations.

Recently, in order to increase the operating speed of a semiconductor device, a DDR2, DDR3, DDR4, or DDR5 method of inputting/outputting multi-bit data every clock cycle is used. If the input/output speed of data is increased, a separate device and method for guaranteeing the reliability of data transmission is additionally required because the probability that an error occurs in a process of the data being transmitted is also increased.

There is used a method of guaranteeing the reliability of data transmission by generating an error check code capable of checking whether an error occurs whenever data is transmitted and transmitting the error check code along with the data. The error check code includes an error detection code (EDC) capable of detecting an error which occurred and an error correction code (ECC) capable of autonomously correcting an error when the error occurs.

SUMMARY

In an embodiment according to the present disclosure, a semiconductor system may include a controller configured to output a command and multiple addresses for performing a read modify write operation when the multiple addresses for performing a read operation have a logic level combination for selecting contiguous regions and configured to output first data for performing a write operation, and a semiconductor device configured to store the first data for performing the write operation as write data based on the command, configured to output internal data from a core circuit as the read operation is consecutively performed based on the command and the addresses, configured to generate parities by performing an error correction code (ECC) operation based on the internal data and the write data, and configured to store the write data and the parities in the core circuit.

Furthermore, in an embodiment according to the present disclosure, a semiconductor system may include a controller configured to output a command and first and second addresses for performing a read modify write operation when the first and second addresses have a logic level combination for selecting contiguous regions and configured to output first data, and a semiconductor device configured to store the first data in a data storage circuit as write data after the start of a read modify write operation based on the command, configured to output second internal data that has been stored in a memory cell of a core circuit that is selected based on the command and the second address after outputting first internal data that has been stored in a memory cell of the core circuit that is selected based on the command and the first address, configured to generate parities by performing an error correction code (ECC) operation based on the first and second internal data and the write data, and configured to store the write data and the parities in a memory cell of the core circuit that is selected by the first address.

Furthermore, in an embodiment according to the present disclosure, a semiconductor system may include a controller configured to output first and second chip selection signals, a command address, and first data, and configured to receive second and third data, a first is semiconductor device configured to perform a read modify write operation based on a logic level combination of the command address when the first chip selection signal is enabled, configured to store the first data as write data, configured to output first and second internal data that have been stored in a memory cell that is selected by the command address in a read operation of the read modify write operation, configured to generate a first parity by performing an error correction code (ECC) operation based on the first and second internal data and the write data, configured to store the write data and the first parity in a write operation of the read modify write operation, and configured to output the first and second internal data as the second data by serializing the first and second internal data, and a second semiconductor device configured to perform a normal operation based on a logic level combination of the command address when the second chip selection signal is enabled, configured to store third internal data that is generated from the first data in a memory cell that is selected by the command address in a write operation of the normal operation, and configured to output fourth internal data as the third data by correcting an error of the fourth internal data based on the fourth internal data and a second parity that have been stored in a memory cell that is selected by the command address in a read operation of the normal operation.

DETAILED DESCRIPTION

Figure 1:
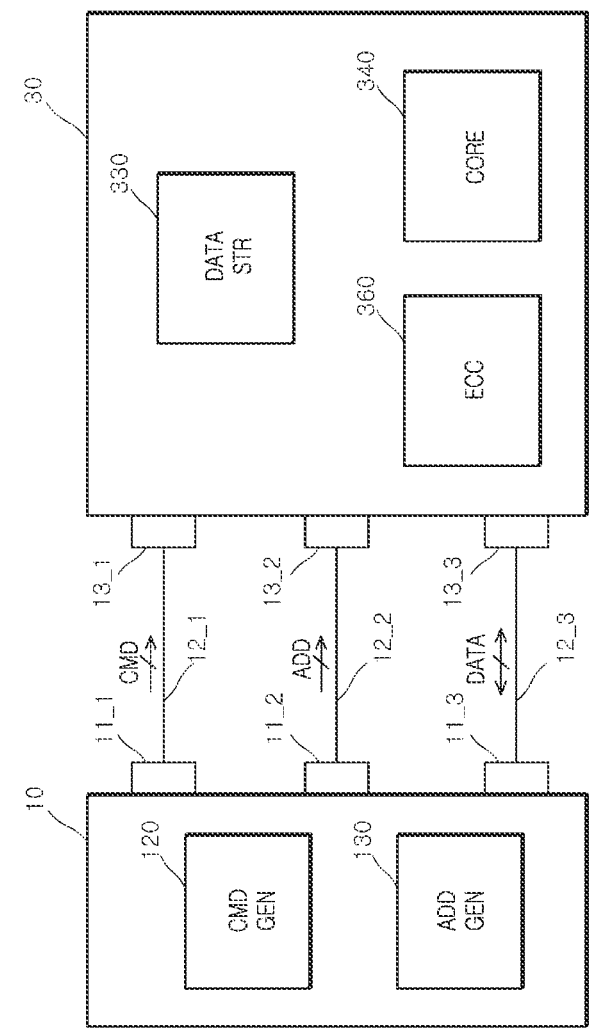
FIG. 1 is a block diagram illustrating a semiconductor system according to an embodiment of the present disclosure.

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. On the other hand, when one component is referred to as being "directly coupled" or "directly connected" to another component, it should be understood that the components are directly coupled or connected to each other without another component interposed therebetween.

A "logic high level" and a "logic low level" are used to describe the logic levels of signals, A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the present disclosure will be described in more detail through embodiments. The embodiments are only used to illustrate the present disclosure, and the scope of the present disclosure is not limited by the embodiments.

The present disclosure may provide a semiconductor system which performs a read modify write operation when multiple addresses for performing a read operation have a logic level combination for selecting contiguous regions.

Furthermore, the present disclosure may provide a semiconductor system capable of improving operating efficiency of semiconductor devices in a way to perform operations by providing another command to a semiconductor device between times when a write operation is performed on a semiconductor device.

Furthermore, the present disclosure may provide a semiconductor system capable of improving operating efficiency of semiconductor devices by performing a normal operation on the other semiconductor device during the interval in which a read modify operation is performed on one semiconductor device.

The present disclosure has an effect in that a read modify write operation can be performed when multiple addresses for performing a read operation have a logic level combination for selecting contiguous regions.

Furthermore, the present disclosure has an effect in that operating efficiency of semiconductor devices can be improved by providing another command to a semiconductor device between times when a write operation is performed on a semiconductor device so that the semiconductor device performs the write operation.

Furthermore, the present disclosure also has an effect in that operating efficiency of semiconductor devices can be improved by performing a normal operation on the other semiconductor device during the interval in which a read modify operation is performed on one semiconductor device.

As illustrated in FIG. 1, a semiconductor system 1 according to an embodiment of the present disclosure may include a controller 10 and a semiconductor device 30.

The controller 10 may include a first control pin 11_1, a second control pin 11_2, and a third control pin 11_3. The semiconductor device 30 may include a first device pin 13_1, a second device pin 13_2, and a third device pin 13_3.

The controller 10 may transmit a command CMD to the semiconductor device 30 through a first transmission line 12_1 connecting the first control pin 11_1 and the first device pin 13_1. Each of the first control pin 11_1, the first transmission line 12_1, and the first device pin 13_1 may be implemented in a plural number depending on the number of bits of the command CMD. The controller 10 may transmit an address ADD to the semiconductor device 30 through a second transmission line 12_2 connecting the second control pin 11_2 and the second device pin 13_2. Each of the second control pin 11_2, the second transmission line 12_2, and the second device pin 13_2 may be implemented in a plural number depending on the number of bits of the address ADD. The command CMD and the address ADD have been implemented to be transmitted from the controller 10 to the semiconductor device 30 through different pins and different transmission lines, but may be implemented to be transmitted from the controller 10 to the semiconductor device 30 through the same pin and the same transmission line. The controller 10 may output data DATA to the semiconductor device 30 or receive data DATA from the semiconductor device 30 through a third transmission line 12_3 connecting the third control pin 11_3 and the third device pin 13_3. Each of the third control pin 13_3, the third transmission line 12_3, and the third device pin 13_3 may be implemented in a plural number depending on the number of bits of the data DATA.

The controller 10 may include a command generation circuit (CMD GEN) 120 and an address generation circuit (ADD GEN) 130.

The command generation circuit 120 may generate the command CMD for controlling a normal operation and read modify write operation of the semiconductor device 30. The command generation circuit 120 may generate the command CMD having a logic level combination for performing the read modify write operation of the semiconductor device 30. The read modify write operation may be set as an operation of performing a write operation after consecutively performing a read operation "N" times. "N" may be set as a natural number. The command generation circuit 120 may generate the command CMD having a logic level combination for performing the normal operation of the semiconductor device 30.

The address generation circuit 130 may generate the address ADD for selecting a memory cell in a normal operation and a read modify write operation. The address generation circuit 130 may generate a read write entry signal (NRW in FIG. 2) that is enabled when multiple read addresses (RAD1<1:M>, RAD2<1:M>, RAD3<1:M> or RAD4<1:M> in FIG. 2) for performing a read operation have a logic level combination for selecting contiguous regions. The address generation circuit 130 may sequentially output, as the addresses ADD, the multiple read addresses (RAD1<1:M>, RAD2<1:M>, RAD3<1:M>, or RAD4<1:M> in FIG. 2) for performing a read operation in a read modify write operation. The address generation circuit 130 may output write addresses (WAD<1:M> in FIG. 2) for performing a write operation as the address ADD in the read modify write operation.

When the multiple read addresses (RAD1<1:M>, RAD2<1:M>, RAD3<1:M>, or RAD4<1:M> in FIG. 2) for performing a read operation have a logic level combination for selecting contiguous regions, the controller 10 may output the command CMD and the address ADD for performing a read modify write operation, and may output the data DATA for performing a write operation. The controller 10 may receive the data DATA from the semiconductor device 30.

The semiconductor device 30 may include a data storage circuit (DATA STR) 330, a core circuit (CORE) 340, and an error correction circuit (ECC) 360.

The data storage circuit 330 may store the data DATA during a read modify write operation. The data storage circuit 330 may output, to the error correction circuit 360, the data DATA that is stored during the read modify write operation. The data storage circuit 330 may output, to the core circuit 340, the data DATA that is stored during the read modify write operation.

The core circuit 340 may consecutively output internal data (ID<1:64> in FIG. 7) that are stored in a memory cell that is selected by the address ADD during a read operation of a read modify write operation. The core circuit 340 may store, in a memory cell that is selected by the address ADD, the internal data (ID<1:64> in FIG. 7) that are generated from the data DATA stored in the data storage circuit 330 and parities (PRT<1:8> in FIG. 7) that are generated from the error correction circuit 360, during a write operation of the read modify write operation. The internal data (ID<1: 64> in FIG. 7) and the parities (PRT<1:8> in FIG. 7) that are stored in the core circuit 340 may be stored in memory cells at different locations. The core circuit 340 may output the internal data (ID<1:64> in FIG. 7) that are stored in a memory cell that is selected by the address ADD, during a read operation of a normal operation. The core circuit 340 may store, in a memory cell that is selected by the address ADD, the internal data (ID<1:64> in FIG. 7) that are generated from the data DATA, during a write operation of the normal operation.

The error correction circuit 360 may sequentially store the internal data (ID<1:64> in FIG. 7) that are consecutively output by the core circuit 340, during a read operation of a read modify write operation. The error correction circuit 360 may generate the parities (PRT<1:8> in FIG. 7) by performing an ECC operation on the internal data (ID<1:64> in FIG. 7) that are stored during a write operation of the read modify write operation and the data DATA that is output by the data storage circuit 330. The error correction circuit 360 may correct an error that is included in the internal data (ID<1:64> in FIG. 7) that are output by the core circuit 340 during a read operation of a normal operation, and may output the corrected internal data as the TO data DATA. The error correction circuit 360 may generate the parities (PRT<1:8> in FIG. 7) that include error information of the internal data (ID<1:64> in FIG. 7) that are generated from the data DATA, during a write operation of the normal operation.

The semiconductor device 30 may store, as write data (WD<1:64> in FIG. 7), the data DATA for a write operation in a read modify write operation based on the command CMD, The semiconductor device 30 may output the internal data (ID<1:64> in FIG. 7) from the core circuit 340 as a read operation is consecutively performed in the read modify write operation based on the command CMD and the address ADD. The semiconductor device 30 may generate the parities (PRT<1:8> in FIG. 7) by performing an ECC operation based on the internal data (ID<1:64> in FIG. 7) and the write data (WD<1:64> in FIG. 7), and may store the write data (WD<1:64> in FIG. 7) and the parities (PRT<1: 8> in FIG. 7) in the core circuit 340. The semiconductor device 30 may output, as the data DATA, the internal data (ID<1:64> in FIG. 7) that are output as the read operations are consecutively performed, by serializing the internal data (ID<1:64> in FIG. 7). The ECC operation may include an ECC encoding operation and an ECC decoding operation. The ECC encoding operation may be set as an operation of generating a parity signal that includes error information of data that is input in a write operation by using an error correction code (ECC). The ECC decoding operation may include an operation of generating a syndrome by comparing a parity that has been stored in the semiconductor device 30 in a read operation and a parity that is newly generated through an ECC encoding operation for output data, identifying a location of an error based on the generated syndrome, and correcting the error the location of which has been identified.

Figure 2:
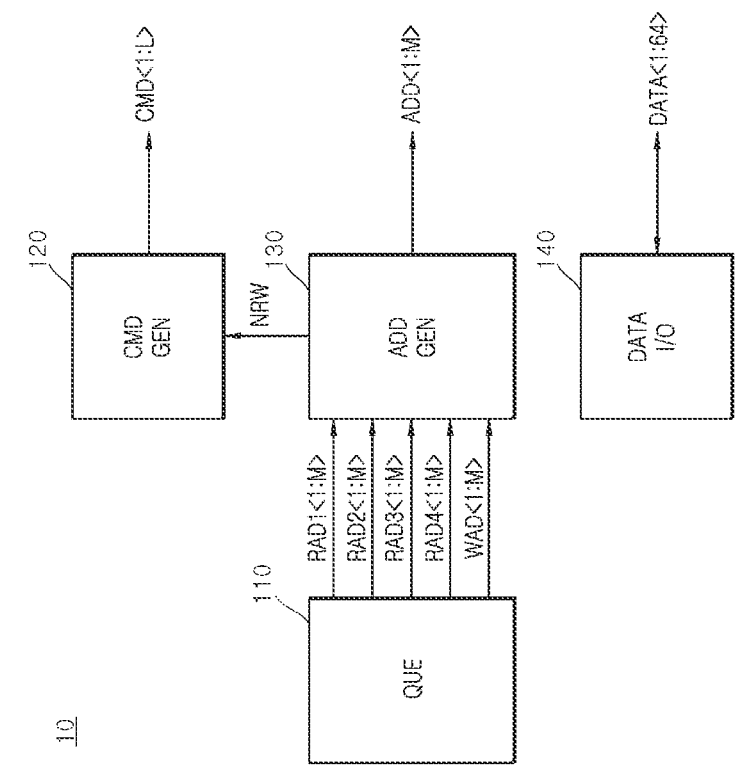
FIG. 2 is a detailed block diagram illustrating an example of a controller that is included in the semiconductor system illustrated in FIG. 1. according to an embodiment of the present disclosure.

FIG. 2 is a detailed block diagram illustrating an example of the controller 10 that is included in the semiconductor system 1 according to an embodiment of the present disclosure. The controller 10 may further include a queuing circuit (QUE) 110 and a data input/output circuit (DATA I/O) 140, in addition to the command generation circuit (CMD GEN) 120 and the address generation circuit (ADD GEN) 130.

The queuing circuit 110 may store and output the first read addresses RAD1<1:M>, the second read addresses RAD2<1:M>, the third read addresses RAD3<1:M>, and the fourth read addresses RAD4<1:M> for performing a read operation in a normal operation and a read modify write operation. The queuing circuit 110 may store and output the write addresses WAD<1:M> for performing a write operation in a normal operation and a read modify write operation. The queuing circuit 110 may output the first read addresses RAD1<1:M>, the second read addresses RAD2<1:11>, the third read addresses RAD3<1:M>, and the fourth read addresses RAD4<1:M> by determining the order of read operations in a normal operation and a read modify write operation. The queuing circuit 110 may store and output a command and address for controlling an operation of the semiconductor device 30, and may be implemented as a circuit that determines an operation order. The number "M" of bits of each of the first read addresses RAD1<1:M>, the second read addresses RAD2<1:M>, the third read addresses RAD3<1:M>, the fourth read addresses RAD4<1:M>, and the write addresses WAD<1:M> may be set as a natural number.

The command generation circuit 120 may generate commands CMD<1:L> having a logic level combination for performing a normal operation and a read modify write operation. The command generation circuit 120 may generate the commands CMD<1:L> having a logic level combination for performing consecutive read operations and a write operation in the read modify write operation when the read write entry signal NRW is enabled. The command generation circuit 120 may generate the commands CMD<1:L> having a logic level combination for performing an active operation, a read operation, a write operation, and a precharge operation in the normal operation. The number "L." of bits of the commands CMD<1: L> may be set as a natural number.

The address generation circuit 130 may generate the read write entry signal NRW that is enabled when the first read addresses RAD1<1:M>, the second read addresses RAD2<1:M>, the third read addresses RAD3<1:M and the fourth read addresses RAD4<1:M> for performing a read operation have a logic level combination for selecting contiguous regions. The address generation circuit 130 may sequentially output, as addresses ADD<1:M>, the first read addresses RAD1<1:M>, the second read addresses RAD2<1:M>, the third read addresses RAD3<1:M>, and the fourth read addresses RAD4<1:M> for performing the read operation. The address generation circuit 130 may output the write addresses WAD<1:M> for performing a write operation as the addresses ADD<1:M>.

The data input/output circuit 140 may receive data DATA<1:64> from the semiconductor device 30 in a read operation. The data input/output circuit 140 may output the data DATA<1:64> to the semiconductor device 30 in a write operation.

Figure 3:
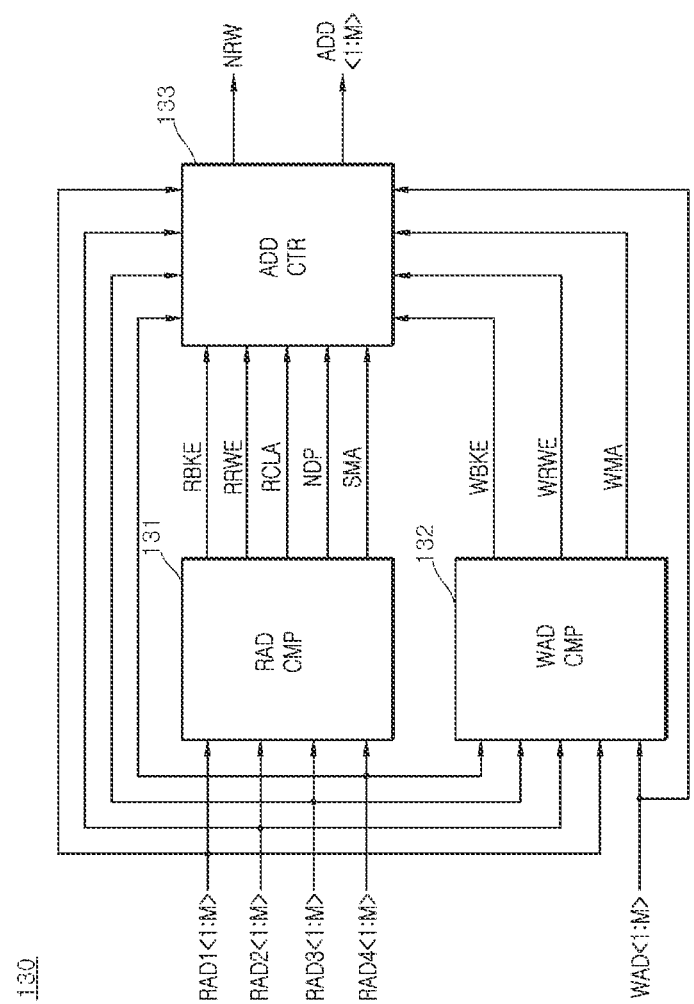
FIG. 3 is a detailed block diagram illustrating an example of an address generation circuit that is included in the controller illustrated in FIG. 2 according to an embodiment of the present disclosure.

FIG. 3 is a detailed block diagram illustrating an example of the address generation circuit 130 that is included in the controller 10 according to an embodiment of the present disclosure. The address generation circuit 130 may include a read address comparison circuit (RAD CMP) 131, a write address comparison circuit (WAD CMP) 132, and an address control circuit (ADD CTR) 133.

The read address comparison circuit 131 may generate a read bank detection signal RBKE, a read row detection signal RRWE, a read-contiguous signal RCLA, a data-consecutive signal NDP, and the smallest address signal SMA by comparing the first read addresses RAD1<1:M>, the second read addresses RAD2<1:M>, the third read addresses RAD3<1:M and the fourth read addresses RAD4<1:M> for performing a read operation.

The write address comparison circuit 132 may generate a write bank detection signal WBKE, a write row detection signal WRWE, and a matching signal WMA by comparing the first read addresses RAD1<1:M>, the second read addresses RAD2<1:M>, the third read addresses RAD3<1:M>, and the fourth read addresses RAD4<1:M for performing a read operation and the write addresses WAD<1:M> for performing a write operation.

The address control circuit 133 may generate the read write entry signal NRW based on the read bank detection signal RBKE, the read row detection signal RRWE, the read-contiguous signal RCLA, the data-consecutive signal NDP, the smallest address signal SMA, the write bank detection signal WBKE, the write row detection signal WRWE, and the matching signal WMA. The address control circuit 133 may generate the addresses ADD<1:M> from the first read addresses RAD1<1:M>, the second read addresses RAD2<1:M>, the third read addresses RAD3<1:M>, and the fourth read addresses RAD4<1:M> during a read operation. The address control circuit 133 may generate the addresses ADD<1:M> from the smallest address signal SMA and the write addresses WAD<1:M> during a write operation.

Figure 4:
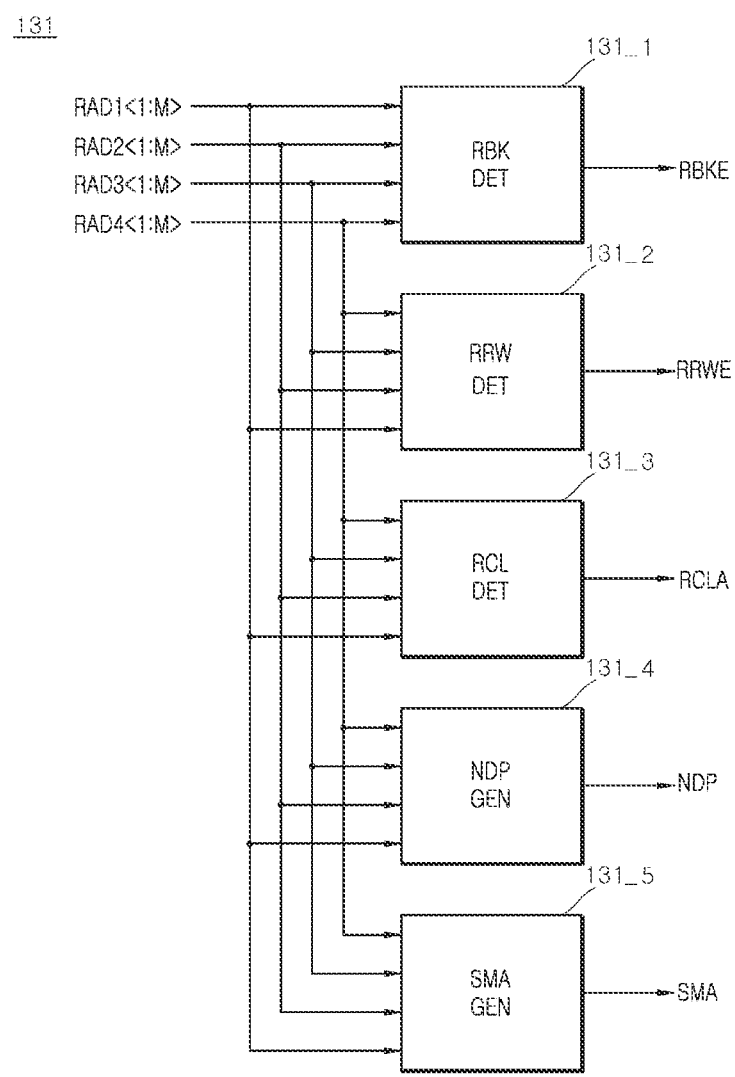
FIG. 4 is a detailed block diagram illustrating an example of a read address comparison circuit that is included in the address generation circuit illustrated in FIG. 3 according to an embodiment of the present disclosure.

FIG. 4 is a detailed block diagram illustrating an example of the read address comparison circuit 131 that is included in the address generation circuit 130 according to an embodiment of the present disclosure. The read address comparison circuit 131 may include a read bank detection circuit (RBK DET) 131_1, a read row detection circuit (RRW DET) 131_2, a read-contiguous detection circuit (RCL DET) 131_3, a data-consecutive signal generation circuit (NDP GEN) 131_4, and the smallest address signal generation circuit (SMA GEN) 131_5.

The read bank detection circuit 131_1 may generate the read bank detection signal RBKE that is enabled when logic level combinations of a first group of bits that are included in the first read addresses RAD1<1:M>, the second read addresses RAD2<1:M>, the third read addresses RAD3<1:M>, and the fourth read addresses RAD4<1:M> are the same. The read bank detection circuit 131_1 may generate the read bank detection signal RBKE that is enabled to a logic high level when logic level combinations of first to fourth bits RAD1<1:4> of the first read address, first to fourth bits RAD2<1:4> of the second read address, first to fourth bits RAD3<1:4> of the third read address, and first to fourth bits RAD4<1:4> of the fourth read address are the same. The first to fourth bits of the first group that are included in the first read addresses RAD1<1:M>, the second read addresses RAD2<1:M>, the third read addresses RAD3<1:M>, and the fourth read addresses RAD4<1:N1> may be set as bits for selecting a first bank (341 in FIG. 8), a second bank (342 in FIG. 8), a third bank (343 in FIG. 8), and a fourth bank (344 in FIG. 8) that are included in the core circuit (340 in FIG. 7).

The read row detection circuit 131_2 may generate the read row detection signal RRWE that is enabled when logic level combinations of a second group of bits that are included in the first read addresses RAD1<1:M>, the second read addresses RAD2<1:M the third read addresses RAD3<1:M>, and the fourth read addresses RAD4<1:M> are the same. The read row detection circuit 131_2 may generate the read row detection signal RRWE that is enabled to a logic high level when logic level combinations of fifth to twelfth bits RAD1<5:12> of the first read address, fifth to twelfth bits RAD2<5:12> of the second read address, fifth to twelfth bits RAD3<5:12> of the third read address, and fifth to twelfth bits RAD4<5:12> of the fourth read address are the same. The fifth to twelfth bits of the second group that are included in the first read addresses RAD1<1:M>, the second read addresses RAD2<1:M>, the third read addresses RAD3<1:M>, and the fourth read addresses RAD4<1:M> may be set as bits for selecting word lines WL1 to WLS that are included in the first bank (341 in FIG. 8), the second bank (342 in FIG. 8), the third bank (343 in FIG. 8), and the fourth bank (344 in FIG. 8).

The read-contiguous detection circuit 1313 may generate the read-contiguous signal RCLA that is enabled when logic level combinations of a third group of bits that are included in the first read addresses RAD1<1:M>, the second read addresses RAD2<1:M>, the third read addresses RAD3<1:N1> and the fourth read addresses RAD4<1:M> are logic level combinations for selecting contiguous regions. The read-contiguous detection circuit 131_3 may generate the read-contiguous signal RCLA that is enabled to a logic high level when logic level combinations of thirteenth to twentieth bits RAD1<13:20> of the first read address, thirteenth to twentieth bits RAD2<13:20> of the second read address, thirteenth to twentieth bits RAD3<13:20> of the third read address, and thirteenth to twentieth bits RAD4<13:20> of the fourth read address are logic level combinations for selecting contiguous regions. The thirteenth to twentieth bits of the third group that are included in the first read addresses RAD1<1:M>, the second read addresses RAD2<1:M>, the third read addresses RAD3<1:M>, and the fourth read addresses RAD4<1:N1> may be set as bits for selecting bit lines BL1 to BL8 that are included in the first bank (341 in FIG. 8), the second bank (342 in FIG. 8), the third bank (343 in FIG. 8), and the fourth bank (344 in FIG. 8).

The data-consecutive signal generation circuit 131_4 may generate the data-consecutive signal NDP that is enabled when a read operation is consecutively performed with respect to the first read addresses RAD1<1:M>, the second read addresses RAD2<1:M>, the third read addresses RAD3<1:M>, and the fourth read addresses RAD4<1:M>, The data-consecutive signal generation circuit 131_4 may generate the data-consecutive signal NDP that is enabled to a logic high level when another operation is not present during a read operation for the first read addresses RAD1<1:M>, the second read addresses RAD2<1:M>, the third read addresses RAD3<1:M>, and the fourth read addresses RAD4<1:M>.

The smallest address signal generation circuit 131_5 may generate the smallest address signal SMA that is enabled by detecting the smallest read address, among the first read addresses RAD1<1:M>, the second read addresses RAD2<1:M>, the third read addresses RAD3<1:M>, and the fourth read addresses RAD4<1:M>. The smallest address signal generation circuit 131_5 may generate the smallest address signal SMA that is enabled to a logic high level, when the first read addresses RAD1<1:M>, among the first read addresses RAD1<1:M>, the second read addresses RAD2<1:M>, the third read addresses RAD3<1:M> and the fourth read addresses RAD4<1:M>, have a logic level combination for activating the same word line of the same bank and the lowest bit line is selected. For example, the smallest address signal generation circuit 131_5 may generate the smallest address signal SMA that is enabled to a logic high level, when the first read addresses RAD1<1:M>, the second read addresses RAD2<1:M>, the third read addresses RAD3<1:M>, and the fourth read addresses RAD4<1:M> have logic level combinations for activating the second word line (WL2 in FIG. 9) of the first bank (341 in FIG. 9) in which the first read addresses RAD1<1:M> have a logic level combination for activating the second bit line 81_2, the second read addresses RAD2<1: N1> have a logic level combination for activating the third bit line BL3, the third read addresses RAD3<1:M> have a logic level combination for activating the fourth bit line BL4, and the fourth read addresses RAD4<1:M> have a logic level combination for activating the fifth bit line BL5.

Figure 5:
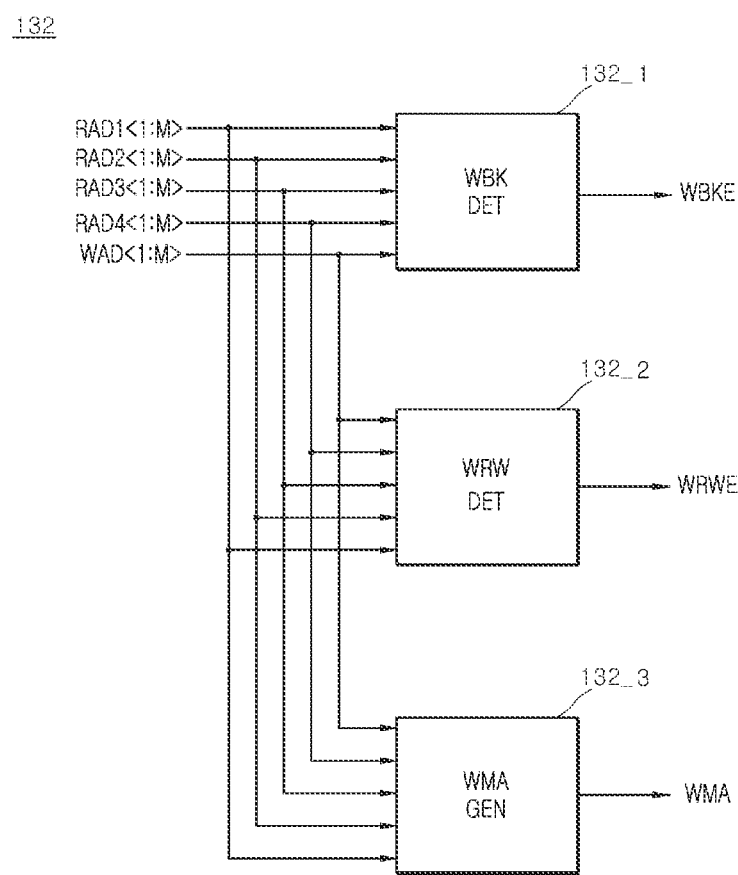
FIG. 5 is a detailed block diagram illustrating an example of a write address comparison circuit that is included in the address generation circuit illustrated in FIG. 3 according to an embodiment of the present disclosure.

FIG. 5 is a detailed block diagram illustrating an example of the write address comparison circuit 132 that is included in the address generation circuit 130 according to an embodiment of the present disclosure. The write address comparison circuit 132 may include a write bank detection circuit (WBK DET) 132_1, a write row detection circuit (WRW DET) 132_2, and a matching signal generation circuit (WMA GEN) 132_3.

The write bank detection circuit 132_1 may generate the write bank detection signal WBKE that is enabled when logic level combinations of the first group of bits that are included in the first read addresses RAD1<1:M>, the second read addresses RAD2<1:M>, the third read addresses RAD3<1:M, the fourth read addresses RAD4<1:M>, and the write addresses WAD<1:M> are the same. The write bank detection circuit 132_1 may generate the write bank detection signal WBKE that is enabled to a logic high level, when logic level combinations of the first to fourth bits RAD1<1:4> of the first read address, the first to fourth bits RAD2<1:4> of the second read address, the first to fourth bits RAD3<1:4> of the third read address, the first to fourth bits RAD4<1:4> of the fourth read address, and the first to fourth bits WAD4<1:4> of the write address are the same. The first to fourth bits of the first group that are included in the first read addresses RAD1<1:M>, the second read addresses RAD2<1:M the third read addresses RAD3<1:M>, the fourth read addresses RAD4<1:M>, and the write addresses WAD<1:M> may be set as bits for selecting the first bank (341 in FIG. 8), the second bank (342 in FIG. 8), the third bank (343 in FIG. 8), and the fourth bank (344 in FIG. 8) that are included in the core circuit (340 in FIG. 7).

The write row detection circuit 132_2 may generate the write row detection signal WRWE that is enabled when logic level combinations of the second group of bits that are included in the first read addresses RAD1<1:M>, the second read addresses RAD2<1:M>, the third read addresses RAD3<1:M>, the fourth read addresses RAD4<1:M>, and the write addresses WAD<1:M> are the same. The write row detection circuit 132_2 may generate the write row detection signal WRWE that is enabled to a logic high level, when logic level combinations of the fifth to twelfth bits RAD1<5:12> of the first read address, the fifth to twelfth bits RAD2<5:12> of the second read address, the fifth to twelfth bits RAD3<5:12> of the third read address, the fifth to twelfth bits RAD4<5:12> of the fourth read address, and the fifth to twelfth bits WAD<4:12> of the write address are the same. The fifth to twelfth bits of the second group that are included in the first read addresses RAD1<1:M>, the second read addresses RAD2<1:M>, the third read addresses RAD3<1:M>, the fourth read addresses RAD4<1:M>, and the write addresses WAD<1:M> may be set as bits for selecting the word lines WL1 to WL8 that are included in the first bank (341 in FIG. 8), the second bank (342 in FIG. 8), the third bank (343 in FIG. 8), and the fourth bank (344 in FIG. 8).

The matching signal generation circuit 132_3 may generate the matching signal WMA that is enabled to a logic high level, when a logic level combination of any of the first read addresses RAD1<1:M>, the second read addresses RAD2<1:11>, the third read addresses RAD3<1:M>, and the fourth read addresses RAD4<1:M> and a logic level combination of the write addresses WAD<1:M> are the same. For example, the matching signal generation circuit 132_3 may generate the matching signal WMA that is enabled to a logic high level when logic level combinations of the first read addresses RAD1<1:N1> and the write addresses WAD<1:M> are the same.

Figure 6:
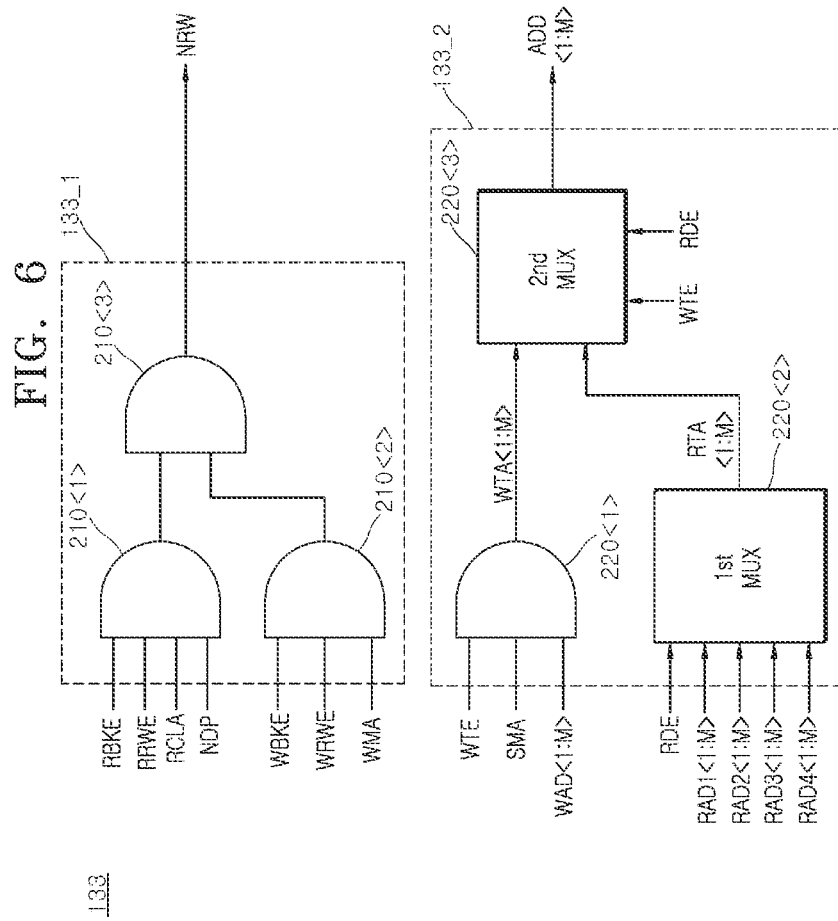
FIG. 6 is a detailed diagram illustrating an example of an address control circuit that is included in the address generation circuit illustrated in FIG. 3 according to an embodiment of the present disclosure.

FIG. 6 is a detailed diagram illustrating an example of the address control circuit 133 that is included in the address generation circuit 130 according to an embodiment of the present disclosure. The address control circuit 133 may include a read write entry signal generation circuit 133_1 and an address output circuit 133_2.

The read write entry signal generation circuit 133_1 may be implemented by using AND gates 210<1>, 210<2>, and 210<3>. The read write entry signal generation circuit 133_1 may generate the read write entry signal NRW, based on a logic level combination of the read bank detection signal RBKE, the read row detection signal RRWE, the read-contiguous signal RCLA, the data-consecutive signal NDP, the write bank detection signal WBKE, the write row detection signal WRWE, and the matching signal WMA. The read write entry signal generation circuit 133_1 may generate the read write entry signal NRW that is enabled to a logic high level when all of the read bank detection signal RBKE, the read row detection signal RRWE, the read-contiguous signal RCLA, the data-consecutive signal NDP, the write bank detection signal WBKE, the write row detection signal WRWE, and the matching signal WMA are enabled to a logic high level.

The address output circuit 133_2 may be implemented by using an AND gate 220<1>, a first multiplexer (1"t MUX) 220<2>, and a second multiplexer ($2^{nd}$ MUX) 220<3>. The AND gate 220<1> may generate write transfer addresses WTA<1:M> by buffering the write addresses WAD<1:M> when a write enable signal WTE and the smallest address signal SMA are enabled to a logic high level. The AND gate 220<1> illustrated in FIG. 6 has been illustrated as being one, but may be implemented as being M in number, that is, the number of bits of the write addresses WAD<1:M> and may be implemented to generate Mbit write transfer addresses WTA<1:M> by buffering M-bit write addresses WAD<1:M> when the write enable signal WTE and the smallest address signal SMA are enabled to a logic high level. The first multiplexer 220<2> may sequentially output, as read transfer addresses RTA<1:M>, the first read addresses RAD1<1:M>, the second read addresses RAD2<1:M>, the third read addresses RAD3<1:M>, and the fourth read addresses RAD4<1:M> when a read enable signal RDE is enabled to a logic high level. The second multiplexer 220<3> may output the write transfer addresses WTA<1:M> as the addresses ADD<1:M> when a write enable signal WTE is enabled to a logic high level. The second multiplexer 220<3> may output the read transfer addresses RTA<1:M> as the addresses ADD<1:M> when the read enable signal RDE is enabled to a logic high level. The write enable signal WTE may be set as a signal that is enabled to a logic high level during a write operation in a normal operation and a read modify write operation. The read enable signal RDE may be set as a signal that is enabled to a logic high level during a read operation in a normal operation and a read modify write operation.

Figure 7:
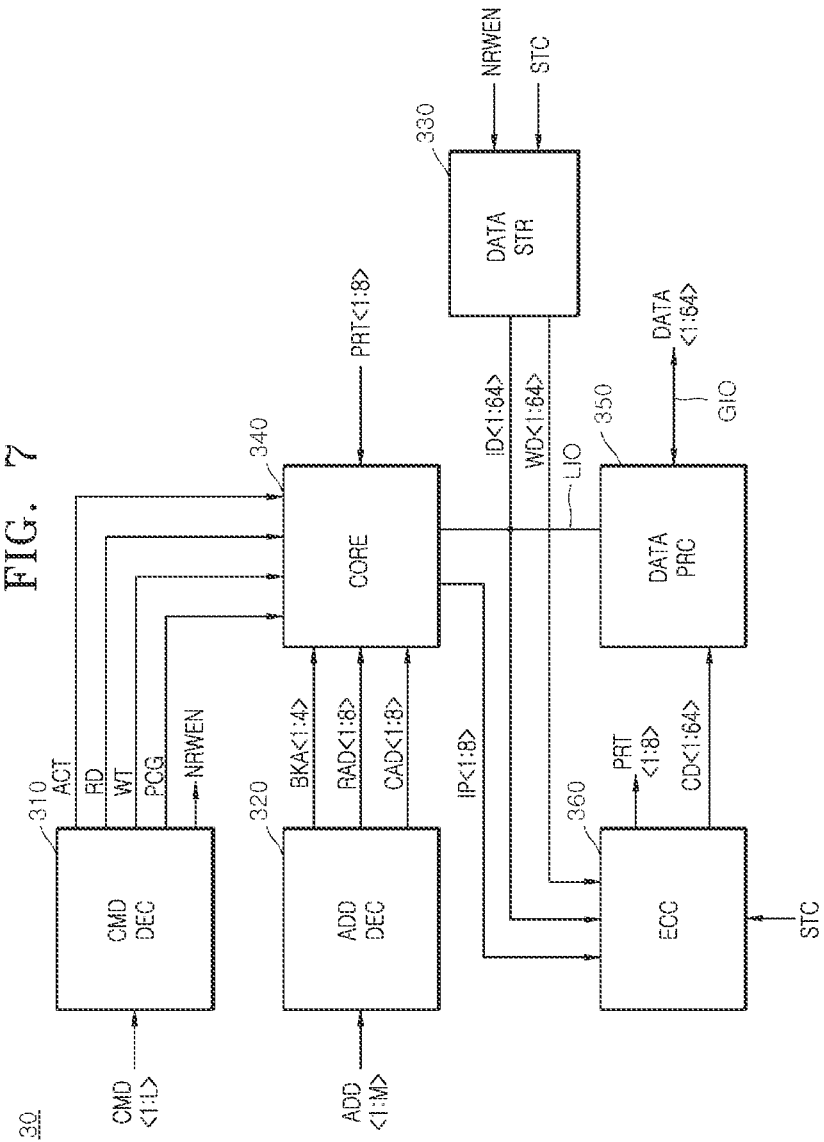
FIG. 7 is a detailed block diagram illustrating an example of a semiconductor device that is included in the semiconductor system illustrated in FIG. 1 according to an embodiment of the present disclosure.

FIG. 7 is a detailed block diagram illustrating an example of the semiconductor device 30 that is included in the semiconductor system 1 according to an embodiment of the present disclosure. The semiconductor device 30 may include a command decoder (CMD DEC) 310, an address decoder (ADD DEC) 320, the data storage circuit (DATA STR) 330, the core circuit (CORE) 340, a data processing circuit (DATA PRC) 350, and the error correction circuit (ECC) 360.

The command decoder 310 may generate an active signal ACT, a read signal RD, a write signal WT, a precharge signal PCG, and a read write enable signal NRWEN by decoding the commands CMD<1:L>. The command decoder 310 may consecutively generate the read signal RD when a logic level combination of the commands CMD<1:L> is a logic level combination for performing a read modify write operation. The command decoder 310 may generate the write signal WT after generating all of the read signals RD when a logic level combination of the commands CMD<1:L> is a logic level combination for performing a read modify write operation. The command decoder 310 may generate the read write enable signal NRWEN when a logic level combination of the commands CMD<1: L> is a logic level combination for performing a read modify write operation. The command decoder 310 may generate the active signal ACT when a logic level combination of the commands CMD<1:L> is a logic level combination for performing an active operation of a normal operation. The command decoder 310 may generate the read signal RD when a logic level combination of the commands CIAD<1:L> is a logic level combination for performing a read operation of a normal operation. The command decoder 310 may generate the write signal WT when a logic level combination of the commands CMD<1: L> is a logic level combination for performing a write operation of a normal operation. The command decoder 310 may generate the precharge signal PCG when a logic level combination of the commands CMD<1:L> is a logic level combination for performing a precharge operation of a normal operation. The number "L" of bits of the commands CMD<1:L> may be set as a natural number. In some embodiments, the command decoder 310 may be implemented to generate various signals for performing various operations by decoding the commands CMD<1 L>.

The address decoder 320 may generate bank addresses BKA<1:4>, row addresses RAD<1:8>, and column addresses CAD<1:8> based on the addresses ADD<1:M>. The address decoder 320 may generate first to fourth bits BKA<1:4> of the bank address from first to fourth bits ADD<1:4> of the address. The address decoder 320 may generate first to eighth bits RAD<1:8> of the row address from fifth to twelfth bits ADD<5:12> of the address. The address decoder 320 may generate first to eighth bits CAD<1:8> of the column address from thirteenth to twentieth bits ADD<13:20> of the address. In some embodiments, the address decoder 320 may be implemented to generate bank addresses, row addresses, and column addresses that include various bits by decoding the addresses ADD<1:M>.

The data storage circuit 330 may store, as the write data WD<1:64>, the internal data ID<1:64> that have been loaded onto a local input/output line ILIO during a read modify write operation. When read write enable signal NRWEN is enabled, the data storage circuit 330 may store, as the write data WD<1:64>, the internal data ID<1:64> that are generated from the data DATA<1:64>, When a storage completion signal STC is enabled, the data storage circuit 330 may output, to the error correction circuit 360, the write data WD<1:64> that have been stored in the data storage circuit 330. The storage completion signal STC may be set as a signal that is enabled when the storage of all of the bits of the write data WD<1:64> is completed.

The core circuit 340 may perform an active operation when the active signal ACT is enabled. In the core circuit 340, when the active signal ACT is enabled, one of the first to fourth banks (341, 342, 343, and 344 in FIG. 8) may be activated by the bank addresses BKA<1:4>, The core circuit 340 may perform a read operation when the read signal RD is enabled. The core circuit 340 may output, to the local input/output line LIO, the internal data ID<1:64> that have been stored in a memory cell of a bank that has been activated by the bank addresses BKA<1:4>, the row addresses RAD<1:8>, and the column addresses CAD<1:8>, when the read signal RD is enabled. The core circuit 340 may output, to the error correction circuit 360, the internal parities IP<1:8> that have been stored in a memory cell of a bank that has been activated by the bank addresses BKA<1:4>, the row addresses RAD<1:8>, and the column addresses CAD<1:8>, when the read signal RD is enabled. The core circuit 340 may perform a write operation when the write signal WT is enabled. The core circuit 340 may store the internal data ID<1:64> that have been loaded onto the local input/output line LIO in a memory cell of a bank that has been activated by the bank addresses BKA<1:4>, the row addresses RAD<1:8>, and the column addresses CAD<1:8>, when the write signal WT is enabled. The core circuit 340 may store the parities PRT<1:8> that are input from the error correction circuit 360 in a memory cell of a bank that has been activated by the bank addresses BKA<1:4>, the row addresses RAD<1:8>, and the column addresses CAD<1:8>, when the write signal \NT is enabled. The core circuit 340 may perform a precharge operation when the precharge signal PCG is enabled. The core circuit 340 may drive, at a set voltage level, the bit lines (BL1 to BL8 in FIG. 9) that are included in the first to fourth banks (341, 342, 343, and 344 in FIG. 8), when the precharge signal PCG is enabled. The active operation may be set as an operation of one of the first to fourth banks (341, 342, 343, and 344 in FIG. 8) being activated. The read operation may be set as an operation of outputting internal data that has been stored in the first to fourth banks (341, 342, 343, and 344 in FIG. 8). The write operation may be set as an operation of storing internal data in the first to fourth banks (341, 342, 343, and 344 in FIG. 8). The precharge operation may be set as an operation of driving, at a set voltage level, the bit lines that are included in the first to fourth banks (341, 342, 343, and 344 in FIG. 8).

The data processing circuit 350 may output error-corrected data CD<1:64> as the data DATA<1:64> by serializing the error-corrected data CD<1:64>, during a read operation in a read modify write operation. The data processing circuit 350 may output the data DATA<1:64> to a global input/output line GIO during the read operation in the read modify write operation. The data processing circuit 350 may generate the internal data ID<1:64> from the data DATA<1:64> that are input from the controller 10, during a write operation in the read modify write operation, and may output the internal data ID<1:64> to the local input/output line LIO. The data processing circuit 350 may output the error-corrected data CD<1:64> as the data DATA<1:64> by serializing the error-corrected data CD<1:64> during a read operation in a normal operation. The data processing circuit 350 may output the data DATA<1:64> to the global input/output line GIG during the read operation in the normal operation. The data processing circuit 350 may generate the internal data ID<1:64> from the data DATA<1:64> that are input from the controller 10 during a write operation in the normal operation, and may output the internal data ID<1:64> to the local input/output line LIO.

The error correction circuit 360 may sequentially store the internal data ID<1:64> that have been loaded onto the local input/output line LIO from the core circuit 340 during a read operation in a read modify write operation. The error correction circuit 360 may sequentially output, as the error-corrected data CD<1:64>, the internal data ID<1:64> that have been sequentially stored during the read operation in the read modify write operation. The error correction circuit 360 may generate the parities PRT<1:8> by performing an ECC operation on the internal data ID<1:64> and the write data WD<1:64> that have been sequentially stored, when the storage completion signal STC is enabled in the read modify write operation. The error correction circuit 360 may generate the parities PRT<1:8> by performing an ECC operation on 256 bits of the internal data and 64 bits of the write data that have been sequentially stored four times, when the storage completion signal STC is enabled in the read modify write operation. The error correction circuit 360 may be implemented to require data having 256 bits in order to generate the parities PRT<1:8> for the write data WD<1:64>. The error correction circuit 360 may generate the error-corrected data CD<1:64> by correcting an error that is included in the internal data ID<1:64>, based on the internal parities IP<1:8> that are output by the core circuit 340 and the internal data ID<1:64> that have been loaded onto the local input/output line LIO, during a read operation in a normal operation.

Figure 8:
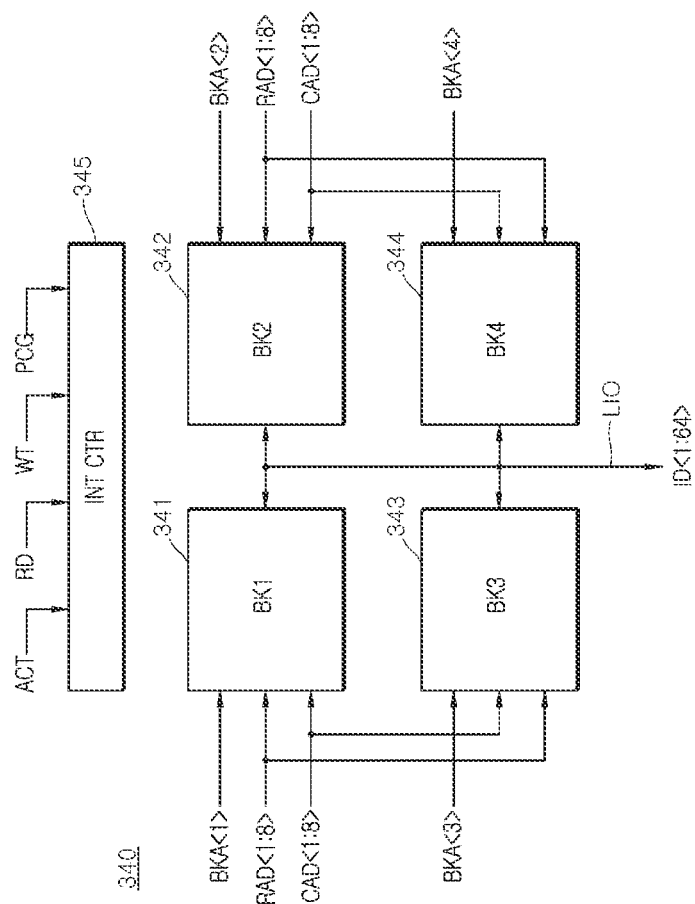
FIG. 8 is a detailed block diagram illustrating an example of a core circuit that is included in the semiconductor device illustrated in FIG. 7 according to an embodiment of the present disclosure.

FIG. 8 is a detailed block diagram illustrating an example of the core circuit 340 that is included in the semiconductor device 30 according to an embodiment of the present disclosure. The core circuit 340 may include the first bank (BK1) 341, the second bank (BK2) 342, the third bank (BK3) 343, the fourth bank (BK4) 344, and an internal control circuit (INT CTR) 345.

The first bank 341 may be activated when a first bit BKA<1> of the bank address is enabled during an active operation. When the first bit BKA<1> of the bank address is enabled during a read operation, the first bank 341 may output, to the local input/output line LIO, the internal data ID<1:64> that have been stored in a memory cell (MC in FIG. 9) that is selected by the row addresses RAD<1:8> and the column addresses CAD<1:8>. When the first bit BKA<1> of the bank address is enabled during a write operation, the first bank 341 may store the internal data ID<1:64> that have been loaded onto the local input/output line LIO in a memory cell (MC in FIG. 9) that is selected by the row addresses RAD<1:8> and the column addresses CAD<1:8> The first bank 341 may drive, at a set voltage level, the bit lines (BL1 to BL8 in FIG. 9) that are included in the first bank 341, during a precharge operation.

The second bank 342 may be activated when a second bit BKA<2> of the bank address is enabled during an active operation. When the second bit BKA<2> of the bank address is enabled during a read operation, the second bank 342 may output, to the local input/output line LIO, the internal data ID<1:64> that have been stored in a memory cell (MC in FIG. 9) that is selected by the row addresses RAD<1:8> and the column addresses CAD<1:8>. When the second bit BKA<2> of the bank address is enabled during a write operation, the second bank 342 may store the internal data ID<1:64> that have been loaded onto the local input/output line LIO in a memory cell (MC in FIG. 9) that is selected by the row addresses RAD<1:8> and the column addresses CAD<1:8>. The second bank 342 may drive, at a set voltage level, the bit lines (BL1 to BL8 in FIG. 9) that are included in the second bank 342, during a precharge operation.

The third bank 343 may be activated when a third bit BKA<3> of the bank address is enabled during an active operation. When the third bit BKA<3> of the bank address is enabled during a read operation, the third bank 343 may output, to the local input/output line LIO, the internal data ID<1:64> that have been stored in a memory cell (MC in FIG. 9) that is selected by the row addresses RAD<1:8> and the column addresses CAD<1:8>. When the third bit BKA<3> of the bank address is enabled during a write operation, the third bank 343 may store the internet data ID<1:64> that have been loaded onto the local input/output line LIO in a memory cell (MC in FIG. 9) that is selected by the row addresses RAD<1:8> and the column addresses CAD<1:8>, The third bank 343 may drive, at a set voltage level, the bit lines (BL1 to BL8 in FIG. 9) that are included in the third bank 343 during a precharge operation.

The fourth bank 344 may be activated when a fourth bit BKA<4> of the bank address is enabled during an active operation. When the fourth bit BKA<4> of the bank address is enabled during a read operation, the fourth bank 344 may output, to the local input/output line LIO, the internal data ID<1:64> that have been stored in a memory cell (MC in FIG. 9) that is selected by the row addresses RAD<1:8> and the column addresses CAD<1:8>, When the fourth bit BKA<4> of the bank address is enabled during a write operation, the fourth bank 344 may store the internal data ID<1:64> that have been loaded onto the local input/output line LIO in a memory cell (MC in FIG. 9) that is selected by the row addresses RAD<1:8> and the column addresses CAD<1:8>. The fourth bank 344 may drive, at a set voltage level, the bit lines (BL1 to BL8 in FIG. 9) included in the fourth bank 344 during a precharge operation.

The internal control circuit 345 may control active operations of the first bank 341, the second bank 342, the third bank 343, and the fourth bank 344 when the active signal ACT is enabled. The internal control circuit 345 may control read operations of the first bank 341, the second bank 342, the third bank 343, and the fourth bank 344 when the read signal RD is enabled. The internal control circuit 345 may control write operations of the first bank 341, the second bank 342, the third bank 343, and the fourth bank 344 when the write signal WT is enabled. The internal control circuit 345 may control precharge operations of the first bank 341, the second bank 342, the third bank 343, and the fourth bank 344 when the precharge signal PCG is enabled. The internal control circuit 345 may be electrically connected to the first bank 341, the second bank 342, the third bank 343, and the fourth bank 344, and may control operations of the first bank 341, the second bank 342, the third bank 343, and the fourth bank 344, The internal control circuit 345 may be implemented to include various circuits that control operations of the first bank 341, the second bank 342, the third bank 343, and the fourth bank 344.

Figure 9:
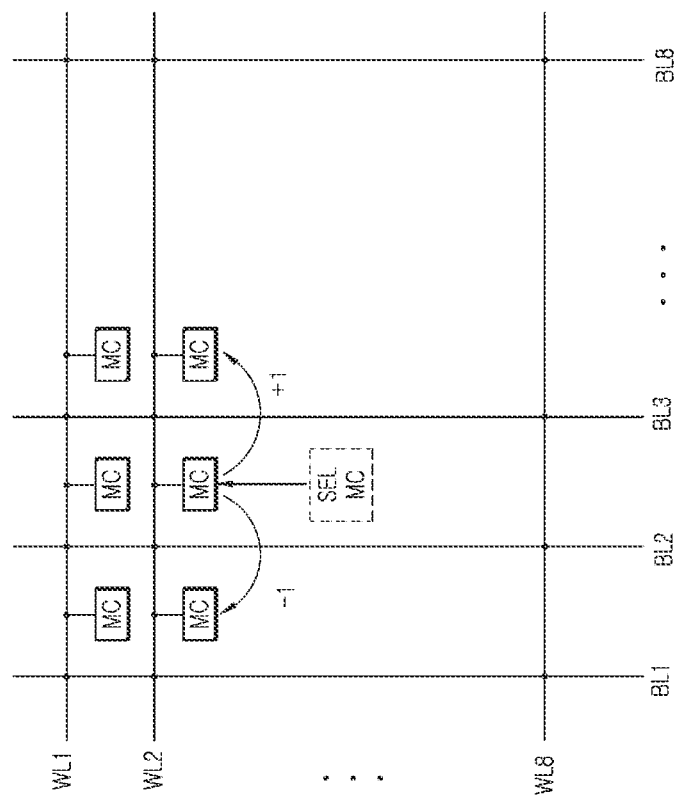
FIG. 9 is a detailed diagram illustrating an example of a first bank that is included in the core circuit illustrated in FIG. 8 according to an embodiment of the present disclosure.

FIG. 9 is a detailed diagram illustrating an example of the first bank 341 that is included in the core circuit 340 according to an embodiment of the present disclosure.

The first bank 341 may be implemented to include the first to eighth word lines WL1 to WL8 and the first to eighth bit lines BL1 to BL8 and to include multiple memory cells MC that are connected to locations at which the first to eighth word lines WL1 to WL8 and the first to eighth bit lines BL1 to BL8 intersect.

The first bank 341 may be activated when the first bit BKA<1> of the bank address is enabled during an active operation. When the first bit BKA<1> of the bank address is enabled during a read operation, the first bank 341 may output, to the local input/output line LIO, the internal data ID<1:64> that have been stored in the memory cell MC that is selected by the row addresses RAD<1:8> and the column addresses CAD<1:8>. When the first bit BKA<1> of the bank address is enabled during a write operation, the first bank 341 may store the internal data ID<1:64> that have been loaded onto the local input/output line LIO in the memory cell MC that is selected by the row addresses RAD<1:8> and the column addresses CAD<1:8>. The first bank 341 may drive, at a set voltage level, the bit lines BL1 to BL8 that are included in the first bank 341 during a precharge operation.

The second bank 342, the third bank 343, and the fourth bank 344 may be implemented to have the same structure as the first bank 341 and may perform the same operation as the first bank 341, thus, a detailed description thereof will be omitted.

An operation of an adjacent memory cell MC being selected by the first bit BKA<1> of the bank address, the row addresses RAD<1:8>, and the column addresses CAD<1:8> that are generated from the addresses ADD<1:M> through the first bank 341 illustrated in FIG. 9 is described as follows.

Prior to a description, the memory cell SEL MC that is selected when the second word line WL2 is activated by the row addresses RAD<1:8> and the second bit line BL2 is activated by the column addresses CAD<1:8> is described as a basis.

A case in which a memory cell −1 that is lower than the memory cell SEL MC that is selected by the first bit BKA<1> of the bank address, the row addresses RAD<1:8>, and the column addresses CAD<1:8> that are generated from the addresses ADD<1:M> is selected may mean a case in which the memory cell MC is selected when the second word line WL2 is activated by the row addresses RAD<1:8> and the first bit line BL1 is activated by the column addresses CAD<1:8>.

A case in which a memory cell +1 that is higher than the memory cell SEL MC that is selected by the first bit BKA<1> of the bank address, the row addresses RAD<1:8>, and the column addresses CAD<1:8> that are generated from the addresses ADD<1:M> is selected may mean a case in which the memory cell MC is selected when the second word line WL2 is activated by the row addresses RAD<1:8> and the third bit line BL3 is activated by the column addresses CAD<1:8>.

Only a case in which a next memory cell MC is selected in order to select memory cells in contiguous regions is illustrated in FIG. 9. In some embodiments, the second next memory cell MC may be selected.

The number of each of word lines and bit lines that are included in the first bank 341 illustrated in FIG. 9 has been implemented as being 8. In some embodiments, various numbers of word lines and bit lines may be implemented.

Figure 10:
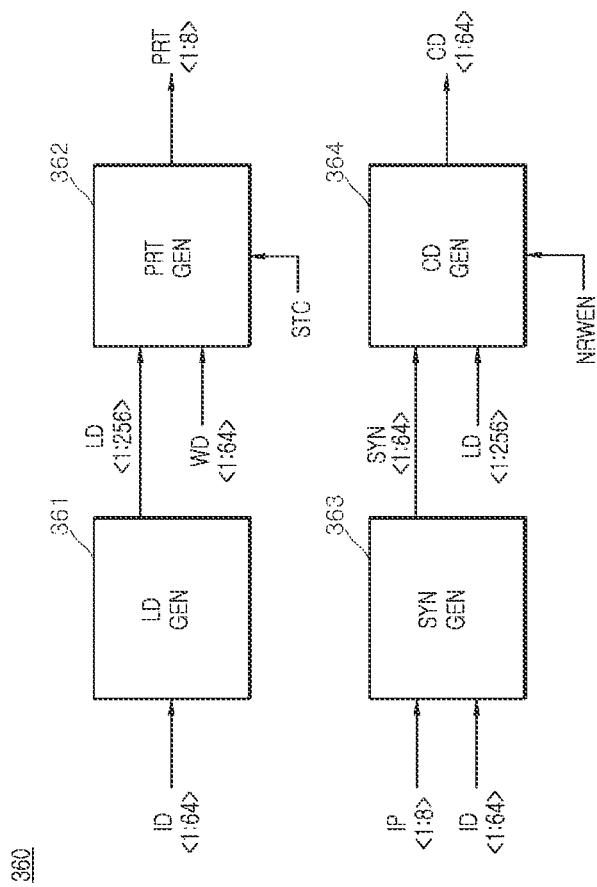
FIG. 10 is a detailed block diagram illustrating an example of an error correction circuit that is included in the semiconductor device illustrated in FIG. 7 according to an embodiment of the present disclosure.

FIG. 10 is a detailed block diagram illustrating an example of the error correction circuit 360 that is included in the semiconductor device 30 according to an embodiment of the present disclosure. The error correction circuit 360 may include a latch data generation circuit (LD GEN) 361, a parity generation circuit (PRT GEN) 362, a syndrome generation circuit (SYN GEN) 363, and an error-corrected data generation circuit (CD GEN) 364.

The latch data generation circuit 361 may generate latch data LD<1:256> by latching the internal data ID<1:64> that are consecutively input during a read operation in a read modify write operation. The latch data generation circuit 361 may generate first to 64th bits LD<1:64> of the latch data by latching the internal data ID<1:64> that are input for the first time during a read operation in a is read modify write operation. The latch data generation circuit 361 may generate 65th to 128th bits LD<65:128> of the latch data by latching the internal data ID<1:64> that are input for the second time, during a read operation in the read modify write operation. The latch data generation circuit 361 may generate $129^{th}$ to $192^{nd}$ bits LD<129:192> of the latch data by latching the internal data ID<1:64> that are input for the third time, during a read operation in the read modify write operation. The latch data generation circuit 361 may generate $193^{rd}$ to $256^{th}$ bits LD<193:265> of the latch data by latching the internal data ID<1:64> that are input for the fourth time, during a read operation in the read modify write operation. The latch data generation circuit 361 may generate the first to $64^{th}$ bits LD<1:64> of the latch data by latching the internal data ID<1:64> that are input during a read operation in a normal operation.

The parity generation circuit 362 may generate the parities PRT<1:8> by performing an ECC encoding operation on the latch data LD<1:256> and the write data WD<1:64> by using an error correction code ECC when the storage completion signal STC is enabled.

The syndrome generation circuit 363 may generate syndromes SYN<1:64> by performing an ECC decoding operation on the internal parities IP<1:8> and the internal data ID<1:64> that are output by the core circuit 340 by using an error correction code ECC during a read operation in a normal operation.

The error-corrected data generation circuit 364 may generate the error-corrected data CD<1:64> from the latch data LD<1:256> when the read write enable signal NRWEN is enabled. The error-corrected data generation circuit 364 may generate the error-corrected data CD<1:64> by serializing the latch data LD<1:256> when the read write enable signal NRWEN is enabled. The error-corrected data generation circuit 364 may generate the error-corrected data CD<1:64> from the first to 64-th bits LD<1:64> of latch data that is generated during the first read operation when the read write enable signal NRWEN is enabled, and may output the error-corrected data CD<1:64>, The error-corrected data generation circuit 364 may generate the error-corrected data CD<1:64> from the 65th to 128th bits LD<65:128> of latch data that is generated during the second read operation when the read write enable signal NRWEN is enabled, and may output the error-corrected data CD<1:64>. The error-corrected data generation circuit 364 may generate the error-corrected data CD<1:64> from the $129^{th}$ to $192^{nd}$ bits LD<129:192> of latch data that is generated during the third read operation when the read write enable signal NRWEN is enabled, and may output the error-corrected data CD<1:64>. The error-corrected data generation circuit 364 may generate the error-corrected data CD<1:64> from the $193^{rd}$ to $256^{th}$ bits LD<193:256> of latch data that is generated during the fourth read operation when the read write enable signal NRWEN is enabled, and may output the error-corrected data CD<1:64>. That is, the error-corrected data generation circuit 364 may output the error-corrected data CD<1:64> four times by serializing the latch data LD<1:256> having 256 bits that are generated as the read operations are consecutively performed four times when the read write enable signal NRWEN is enabled. The error-corrected data generation circuit 364 may generate the error-corrected data CD<1:64> by correcting an error that is included in the latch data LD<1:64> based on the syndromes SYN<1:64> when the read write enable signal NRWEN is disabled. The error-corrected data generation circuit 364 may correct an error that is included in the latch data LD<1:64> by inverting a bit that is included in the latch data LD<1:64> corresponding to a bit that is enabled, among the syndromes SYN<1:64≤, when the read write enable signal NRWEN is disabled. For example, the error-corrected data generation circuit 364 may correct an error that is included in the latch data LD<1:64> by inverting a second bit LD<2> of the latch data when the level of the second bit SYN<2> of the syndrome is enabled to a logic high level, when the read write enable signal NRWEN is disabled, and may output, as the error-corrected data CD<1:64>, the latch data LD<1:64> the error of which has been corrected.

Figure 11:
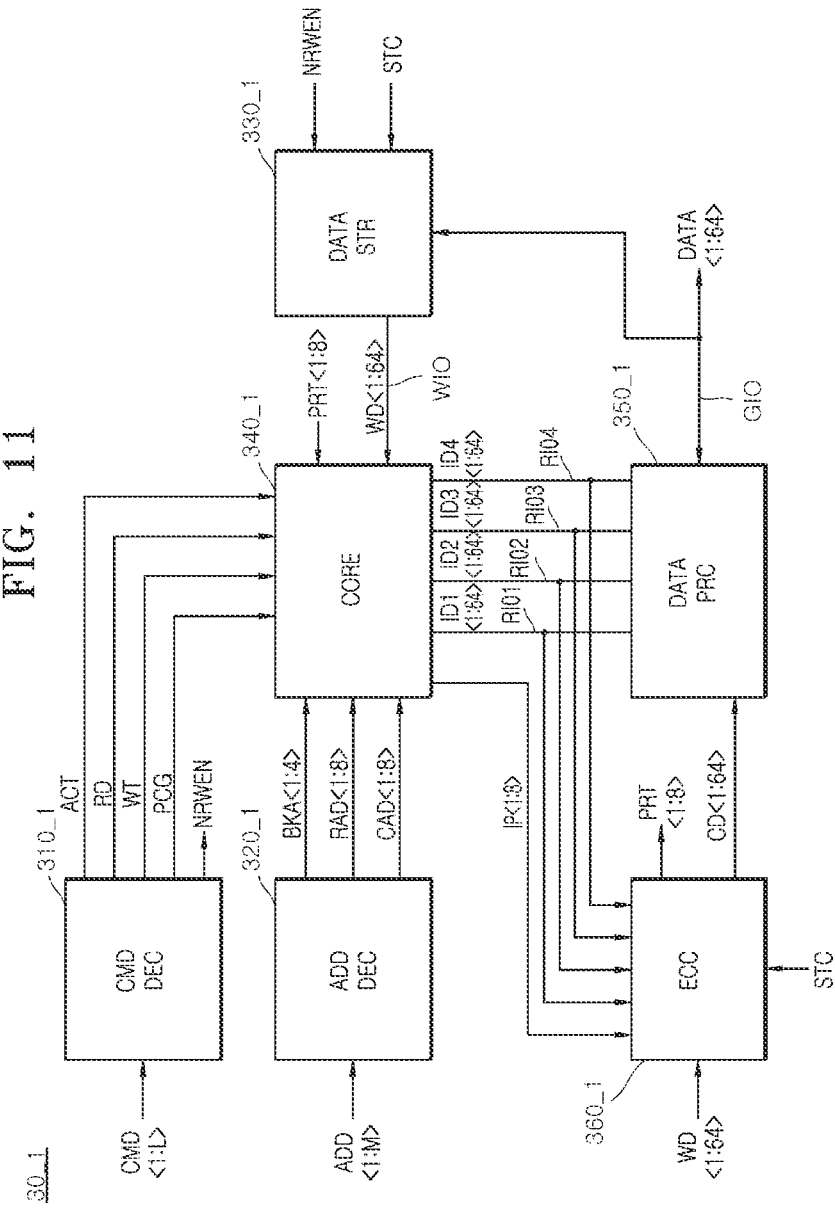
FIG. 11 is a detailed block diagram illustrating another example of a semiconductor device that is included in the semiconductor system illustrated in FIG. 1 according to an embodiment of the present disclosure.

FIG. 11 is a detailed block diagram illustrating another embodiment of the semiconductor device 30 that is included in the semiconductor system 1 according to an embodiment of the present disclosure. A semiconductor device 30_1 may include a command decoder (CMD DEC) 310_1, an address decoder (ADD DEC) 320_1, a data storage circuit (DATA STR) 330_1, a core circuit (CORE) 340_1, a data processing circuit (DATA PRC) 350_1, and an error correction circuit (ECC) 360_1.

The command decoder 310_1 and the address decoder 320_1 illustrated in FIG. 11 may perform the same operations as the command decoder 310 and the address decoder 320 illustrated in FIG. 7, thus, detailed descriptions thereof will be omitted.

The data storage circuit 330_1 may store data DATA<1:64> as write data WD<1:64> during a read modify write operation. The data storage circuit 330_1 may output, to the error correction circuit 360_1, the write data WD<1:64> that have been stored in the data storage circuit 330_1 when a storage completion signal STC is enabled. The data storage circuit 330_1 may output, to the core circuit 340_1, the write data WD<1:64> that have been stored in the data storage circuit 330_1 through a write input/output line WIO when the storage completion signal STC is enabled. The storage completion signal STC may be set as a signal that is enabled when the storage of all of the bits of the write data WD<1:64> is completed.

The core circuit 340_1 may perform an active operation when an active signal ACT is enabled. In the core circuit 340_1, one of the first to fourth banks (341, 342, 343, and 344 in FIG. 8) may be activated by bank addresses BKA<1:4> when the active signal ACT is enabled. The core circuit 340_1 may perform a read operation when a read signal RD is enabled. The core circuit 340_1 may output, to a first read input/output line RIO1, first internal data ID1<1:64> that have been stored in a memory cell of a bank that has been activated by the bank addresses BKA<1:4>, row addresses RAD<1:8>, and column addresses CAD<1:8>, when the first read signal RD is enabled. The core circuit 340_1 may output, to a second read input/output line RIO2, second internal data ID2<1:64> that have been stored in a memory cell of a bank that has been activated by the bank addresses BKA<1:4>, the row addresses RAD<1:8>, and the column addresses CAD<1:8>, when the second read signal RD is enabled. The core circuit 340_1 may output, to a third read input/output line RIO3, third internal data ID3<1:64> that have been stored in a memory cell of a bank that has been activated by the bank addresses BKA<1:4>, the row addresses RAD<1:8>, and the column addresses CAD<1:8>, when the third read signal RD is enabled. The core circuit 340_1 may output, to a fourth read input/output line 8104, fourth internal data ID4<1:64> that have been stored in a memory cell of a bank that has been activated by the bank addresses BKA<1:4>, the row addresses RAD<1:8>, and the column addresses CAD<1:8>, when the fourth read signal RD is enabled. The core circuit 340_1 may output, to the error correction circuit 360_1, internal parities IP<1:8> that have been stored in a memory cell of a bank that has been activated by the bank addresses BKA<1:4>, the row addresses RAD<1:8>, and the column addresses CAD<1:8>, when the read signal RD is enabled. The core circuit 340_1 may perform a write operation when a write signal WT is enabled. The core circuit 340_1 may store write data WD<1:64> that have been loaded onto the write input/output line WIO in a memory cell of a bank that has been activated by the bank addresses BKA<1:4>, the row addresses RAD<1:8>, and the column addresses CAD<1:

8>, when the write signal WT is enabled. The core circuit 340_1 may store parities PRT<1:8> that are input from the error correction circuit 300_1 in a memory cell of a bank that has been activated by the bank addresses BKA<1:4>, the row addresses RAD<1:8>, and the column addresses CAD<1:8>, when the write signal WT is enabled. The core circuit 340_1 may perform a precharge operation when a precharge signal PCG is enabled. The core circuit 340_1 may drive, at a set voltage level, the bit lines (BL1 to BL8 in FIG. 9) that are included in the first to fourth banks (341, 342, 343, and 344 in FIG. 8), when the precharge signal PCG is enabled.

The data processing circuit 350_1 may output error-corrected data CD<1:64> as the data DATA<1:64> by serializing the error-corrected data CD<1:64> during a read operation in a read modify write operation. The data processing circuit 350_1 may output the data DATA<1:64> to a global input/output line GIO during the read operation in the read modify write operation. The data processing circuit 350_1 may output the error-corrected data CD<1:64> as the data DATA<1:64> by serializing the error-corrected data CD<1:64> during a read operation in a normal operation. The data processing circuit 350_1 may output the data DATA<1:64> to the global input/output line GIO during the read operation in the normal operation. The data processing circuit 350_1 may generate the first internal data ID1<1:64> from the data DATA<1:64> that are input from the controller 10 during a write operation in a normal operation, and may output the first internal data ID1<1:64> to the first read input/output line RIO1. The data processing circuit 350_1 has been implemented to input and output the first internal data ID1<1:64> through the first read input/output line RIO1 in a read operation and write operation of a normal operation. In some embodiments, the data processing circuit 350_1 may be implemented to input and output internal data through the second read input/output line RIO2, the third read input/output line RIO3, and the fourth read input/output line RIO4.

The error correction circuit 360_1 may store the first internal data ID1<1:64> from the core circuit 340_1, which have been loaded onto the first read input/output line RIO1, during the first read operation in a read modify write operation. The error correction circuit 360_1 may store the second internal data ID2<1:54> from the core circuit 340._1, which have been loaded onto the second read input/output line 8102, during the second read operation in the read modify write operation. The error correction circuit 360_1 may store the third internal data ID3<1:64> from the core circuit 340_1, which have been loaded onto the third read input/output line RIO3, during the third read operation in the read modify write operation. The error correction circuit 360_1 may store the fourth internal data ID4<1:64> from the core circuit 340_1, which have been loaded onto the fourth read input/output line 8104, during the fourth read operation in the read modify write operation. The error correction circuit 360_1 may sequentially output, as the error-corrected data CD<1:64>, the first internal data ID1<1:64>, the second internal data ID2<1:64>, the third internal data ID3<1:64>, and the fourth internal data ID4<1:64> that have been sequentially stored in the error correction circuit 360_1, during a read operation in a read modify write operation. The error correction circuit 360_1 may generate the parities PRT<1:8> by performing an ECC operation on the first internal data ID1<1:64>, the second internal data ID2<1:64>, the third internal data ID3<1:64>, and the fourth internal data ID4<1:64> that have been sequentially stored in the error correction circuit 3601 and the write data WD<1:64>, when the storage completion signal STC is enabled in a read modify write operation. The error correction circuit 360_1 may generate the parities PRT<1:8> by performing an ECC operation on 256 bits of the first internal data ID1<1:64>, the second internal data ID2<1:64>, the third internal data ID3<1:64>, and the fourth internal data ID4<1:64> and 64 bits of the write data, when the storage completion signal STC is enabled in a read modify write operation. The error correction circuit 3601 may be implemented to require data having 256 bits in order to generate the parities PRT<1:8> for the write data WD<1:64>. The error correction circuit 360_1 may generate the error-corrected data CD<1:64> by correcting an error that is included in the first internal data ID1<1:64> based on the internal parities IP<1:8> that are output from the core circuit 340_1 and the first internal data ID1<1:64> that have been loaded onto the first read input/output line RICA, during a read operation in a normal operation. The error correction circuit 360_1 may generate the parities PRT<1:8> by performing an ECC operation on the first internal data ID1<1:64> that have been loaded onto the first read input/output line RIO1, during a write operation in a normal operation.

The semiconductor device 30_1 illustrated in FIG. 11 may be implemented to perform the same operation as the semiconductor device 30 illustrated in FIG. 7 except that the local input/output line LIO is divided into the first read input/output line RIO1, the second read input/output line RIO2, the third read input/output line 8103, and the fourth read input/output line RIO4 for performing a read operation and the write input/output line WIO for performing a write operation unlike the semiconductor device 30 illustrated in FIG. 7.

As described above, the semiconductor system 1 of the present disclosure may perform a read modify write operation when multiple addresses for performing a read operation have a logic level combination for selecting contiguous regions.

Figure 12:
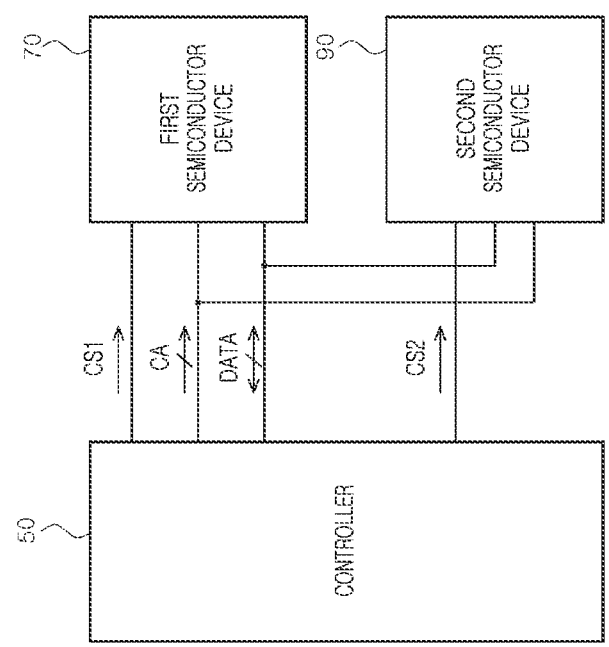
FIG. 12 is a block diagram illustrating a semiconductor system according to another embodiment of the present disclosure.

FIG. 12 is a block diagram illustrating a semiconductor system 2 according to another embodiment of the present disclosure. The semiconductor system 2 may include a controller 50, a first semiconductor device 70, and a second semiconductor device 90.

The controller 50 may output a first chip selection signal CS1, a second chip selection signal CS2, a command address CA, and data DATA to the first semiconductor device 70 and the second semiconductor device 90. The controller 50 may receive the data DATA from the first semiconductor device 70 and the second semiconductor device 90. The first chip selection signal CS1 may be set as a signal that is enabled in order to activate the first semiconductor device 70. The second chip selection signal CS2 may be set as a signal that is enabled in order to activate the second semiconductor device 90. The command address CA may be set as a signal that includes the commands CMD<1: L> and the addresses ADD<1:M> illustrated in FIG. 7, For example, when the first chip selection signal CS1 is generated at a logic high level, the command address CA may be recognized as the commands CMD<1: L>. When the first chip selection signal CS1 is generated at a logic low level, the command address CA may be recognized as the addresses ADD<1:M>.

The first semiconductor device 70 may perform a read modify write operation based on a logic level combination of the command address CA when the first chip selection signal CS? is enabled, and may store the data DATA as the write data (WD<1:64> in FIG. 7), The first semiconductor device 70 may consecutively output the internal data (ID<1:

64> in FIG. 7) that have been stored in a memory cell that is selected by the command address CA in a read operation of the read modify write operation, and may generate the parities (PRT<1:8> in FIG. 7) by performing an ECC operation based on the internal data is (ID<1:64> in FIG. 7) and the write data (WD<1:64> in FIG. 7). The first semiconductor device 70 may output, as the data DATA, the internal data (ID<1:64> in FIG. 7) that have been consecutively output in a read operation of the read modify write operation by serializing the internal data (ID<1:64> in FIG. 7). The first semiconductor device 70 may store the write data (WD<1:64> in FIG. 7) and the parities (PRT<1:8> in FIG. 7) in a write operation of the read modify write operation. The first semiconductor device 70 may output, as the data DATA, the internal data (ID<1:64> in FIG. 7) that have been stored in a memory cell that is selected by the command address CA, during a read operation in a normal operation based on a logic level combination of the command address CA when the first chip selection signal CS1 is enabled. The first semiconductor device 70 may store the internal data (ID<1:64> in FIG. 7) that are generated from the data DATA in a memory cell that is selected by the command address CA, during a write operation in the normal operation based on a logic level combination of the command address CA when the first chip selection signal CS1 is enabled.

The second semiconductor device 90 may perform a read modify write operation based on a logic level combination of the command address CA when the second chip selection signal CS2 is enabled, and may store the data DATA as the write data (WD<1:64> in FIG. 7). The second semiconductor device 90 may consecutively output the internal data (ID<1:64> in FIG. 7) that have been stored in a memory cell that is selected by the command address CA in a read operation of the read modify write operation, and may generate the parities (PRT<1:8> in FIG. 7) by performing an ECC operation based on the internal data (ID<1:64> in FIG. 7) and the write data (WD<1:64> in FIG. 7). The second semiconductor device 90 may output, as the data DATA, the internal data (ID<1:64> in FIG. 7) that have been consecutively output in a read operation of the read modify write operation by serializing the internal data (ID<1:64> in FIG. 7), The second semiconductor device 90 may store the write data (WD<1:64> in FIG. 7) and the parities (PRT<1:8> in FIG. 7) in a write operation of the read modify write operation. The second semiconductor device 90 may output, as the data DATA, the internal data (ID<1:64> in FIG. 7) that have been stored in a memory cell that is selected by the command address CA, during a read operation in a normal operation based on a logic level combination of the command address CA when the second chip selection signal CS2 is enabled. The second semiconductor device 90 may store the internal data (ID<1:64> in FIG. 7) that are generated from the data DATA in a memory cell that is selected by the command address CA, during a write operation in the normal operation based on a logic level combination of the command address CA when the second chip selection signal CS2 is enabled.

Each of the first semiconductor device 70 and the second semiconductor device 90 may be implemented to have the same construction as the semiconductor device 30 illustrated in FIG. 7 and may perform the same operation as the semiconductor device 30 illustrated in FIG. 7 except that each of the first semiconductor device 70 and the second semiconductor device 90 is selectively activated by each of the first chip selection signal CS1 and the second chip selection signal CS2, thus, a detailed description thereof will be omitted.

As described above, the semiconductor system 2 of the present disclosure may perform a read modify write operation when multiple addresses for performing a read operation have a logic level combination for selecting contiguous regions. The semiconductor system 2 can improve operating efficiency of semiconductor devices by performing a normal operation on the other semiconductor device during the interval in which a read modify write operation is performed on one semiconductor device.

Figure 13:
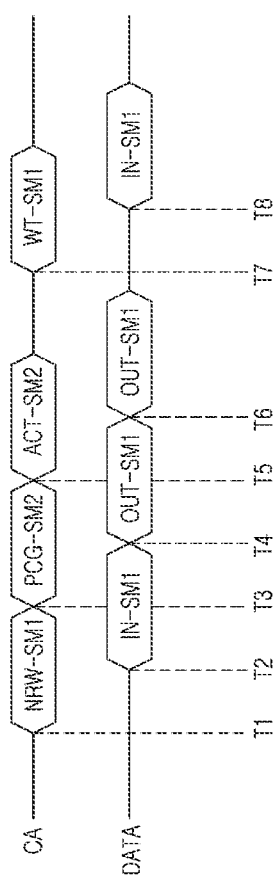
FIGS. 13 and 14 are timing diagrams for describing an operation of the semiconductor system according to an embodiment of the present disclosure.

An operation of the semiconductor system 2 according to an embodiment of the present disclosure performing a read modify write operation and a normal operation may be described with reference to FIG. 13, but an operation of a read operation being performed twice in the read modify write operation is described as follows as an example.

At timing T1, the controller 50 may output, to the first semiconductor device 70, the first chip selection signal CS1 and the command address CA for performing a read modify write operation NRW-SM1 of the first semiconductor device 70.

At timing T2, the controller 50 may output the data (DATA=IN-Sill) for performing the read modify write operation NRW-SM1 of the first semiconductor device 70.

The first semiconductor device 70 may receive the data DATA, and may store the data DATA as the write data (WD<1:64> in FIG. 7), The first semiconductor device 70 may output the internal data (ID<1:64> in FIG. 7) that have been stored in a memory cell that is selected by the command address CA, in the first read operation of the read modify write operation. The first semiconductor device 70 may output the internal data (ID<1:64> in FIG. 7) that have been stored in a memory cell that is selected by the command address CA, in the second read operation of the read modify write operation. The first semiconductor device 70 may generate the parities (PRT<1:8> in FIG. 7) by performing an ECC operation based on 128 bits of the internal data (ID<1:64> in FIG. 7) that are consecutively output twice and 64 bits of the write data (WD<1:64> in FIG. 7), The first semiconductor device 70 may store the write data (WD<1:64> in FIG. 7) and the parities (PRT<1:8> in FIG. 7) in a write operation of the read modify write operation.

At timing T3, the controller 50 may output, to the second semiconductor device 90, the second chip selection signal CS2 and the command address CA for performing a precharge operation PCG-SM2 of the second semiconductor device 90.

At timing T4, the first semiconductor device 70 may output, as the data (DATA=OUT-SM1), the internal data (ID<1:64> in FIG. 7) that have been stored in the first read operation by serializing the internal data (ID<1:64> in FIG. 7).

The second semiconductor device 90 may perform the precharge operation based on the second chip selection signal CS2 and the command address CA for performing the precharge operation.

At timing T5, the controller 50 may output, to the second semiconductor device 90, the second chip selection signal CS2 and the command address CA for performing an active operation ACT-SM2 of the second semiconductor device 90.

At timing T6, the first semiconductor device 70 may output, as the data (DATA=OUT-SM1), the internal data (ID<1:64> in FIG. 7) that have been stored in the second read operation by serializing the internal data (ID<1:64>.

The second semiconductor device 90 may perform the active operation based on the second chip selection signal CS2 and the command address CA for performing the active operation.

At timing T7, the controller 50 may output, to the first semiconductor device 70, the first chip selection signal CS1 and the command address CA for performing a write operation WT-SM1 of a normal operation on the first semiconductor device 70.

At timing T8, the controller 50 may output the data (DATA=IN-SM1) for performing the write operation WT-SM1 of the normal operation on the first semiconductor device 70.

The first semiconductor device 70 may receive the data DATA, and may store the internal data (ID<1:64> in FIG. 7) that are generated from the data DATA in a memory cell that is selected by the command address CA.

As described above, the semiconductor system 2 of the present disclosure can improve operating efficiency of semiconductor devices in a way to perform operations by providing another command to a semiconductor device between times when a write operation is performed on a semiconductor device. The semiconductor system 2 can improve operating efficiency of semiconductor devices by performing a normal operation on the other semiconductor device during the interval in which a read modify operation is performed on one semiconductor device.

Figure 14:
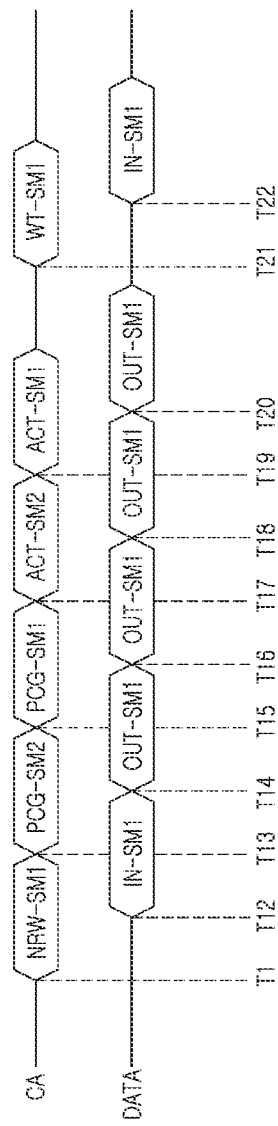

An operation of the semiconductor system 2 according to an embodiment of the present disclosure performing a read modify write operation and a normal operation is described with reference to FIG. 14, but an operation of a read operation being performed four times in the read modify write operation is described as follows as an example.

At timing T11, the controller 50 may output, to the first semiconductor device 70, the first chip selection signal CS1 and the command address CA for performing a read modify write operation NRW-SM1 of the first semiconductor device 70.

At timing 112, the controller 50 may output the data (DATA=IN-SM1) for performing the read modify write operation NRW-SM1 of the first semiconductor device 70.

The first semiconductor device 70 may receive the data DATA, and may store the data DATA as the write data (WD<1:64> in FIG. 7). The first semiconductor device 70 may output the internet data (ID<1:64> in FIG. 7) that have been stored in a memory cell that is selected by the command address CA in the first read operation of the read modify write operation. The first semiconductor device 70 may output the internet data (ID<1:64> in FIG. 7) that have been stored in a memory cell that is selected by the command address CA in the second read operation of the read modify write operation. The first semiconductor device 70 may output the internal data (ID<1:64> in FIG. 7) that have been stored in a memory cell that is selected by the command address CA in the third read operation of the read modify write operation. The first semiconductor device 70 may output the internal data (ID<1:64> in FIG. 7) that have been stored in a memory cell that is selected by the command address CA in the fourth read operation of the read modify write operation. The first semiconductor device 70 may generate the parities (PRT<1:8> in FIG. 7) by performing an ECC operation based on 256 bits of the internal data (ID<1:64> in FIG. 7) that are consecutively output four times and 64 bits of the write data (WD<1:64> in FIG. 7). The first semiconductor device 70 may store the write data (WD<1:64> in FIG. 7) and the parities (PRT<1:8> in FIG. 7) in a write operation of the read modify write operation.

At timing T13, the controller 50 may output, to the second semiconductor device 90, the second chip selection signal CS2 and the command address CA for performing a precharge operation PCG-SM2 of the second semiconductor device 90.

At timing T14, the first semiconductor device 70 may output, as the data (DATA=OUT-SM1), the internal data (ID<1:64> in FIG. 7) that have been stored in the first read operation by serializing the internal data (ID<1:64> in FIG. 7).

The second semiconductor device 90 may perform the precharge operation based on the second chip selection signal CS2 and the command address CA for performing the precharge operation.

At timing T15, the controller 50 may output, to the first semiconductor device 70, the first chip selection signal CS1 and the command address CA for performing a precharge operation PCG-SM1 of the first semiconductor device 70.

At timing T16, the first semiconductor device 70 may output, as the data (DATA=OUT-SM1), the internal data (ID<1:64> in FIG. 7) that have been stored in the second read operation by serializing the internal data (ID<1:64> in FIG. 7). The first semiconductor device 70 may perform the precharge operation based on the first chip selection signal CS1 and the command address CA for performing the precharge operation.

At timing T17, the controller 50 may output, to the second semiconductor device 90, the second chip selection signal CS2 and the command address CA for performing an active operation ACT-SM2 of the second semiconductor device 90.

At timing T18, the first semiconductor device 70 may output, as the data (DATA=OUT-SM1), the internal data (ID<1:64> in FIG. 7) that have been stored in the third read operation by serializing the internal data (ID<1:64> in FIG. 7).

The second semiconductor device 90 may perform the active operation based on the second chip selection signal CS2 and the command address CA for performing the active operation.

At timing T19, the controller 50 may output, to the first semiconductor device 70, the first chip selection signal CS1 and the command address CA for performing an active operation ACT-SM1 of the first semiconductor device 70.

At timing T20, the first semiconductor device 70 may output, as the data (DATA=OUT-SM1), the internal data (ID<1:64> in FIG. 7) that have been stored in the fourth read operation by serializing the internal data (ID<1:64> in FIG. 7).

The first semiconductor device 70 may perform the active operation based on the first chip selection signal CS1 and the command address CA for performing the active operation.

At timing T21, the controller 50 may output, to the first semiconductor device 70, the first chip selection signal CS1 and the command address CA for performing a write operation WT-SM1 of a normal operation on the first semiconductor device 70.

At timing T22, the controller 50 may output the data (DATA=IN-SM1) for performing the write operation WT-SM1 of the normal operation on the first semiconductor device 70.

The first semiconductor device 70 may receive the data DATA, and may store the internal data (ID<1:64> in FIG. 7) that are generated from the data DATA in a memory cell that is selected by the command address CA.

Figure 15:
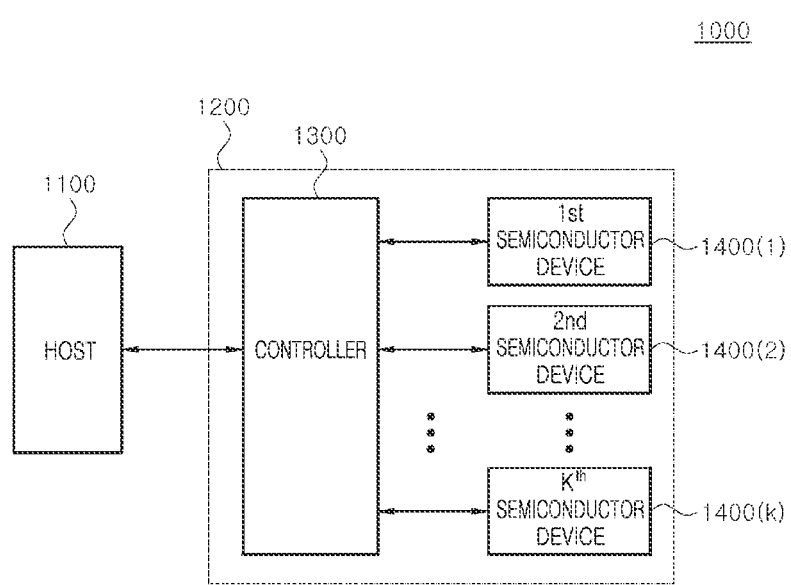
FIG. 15 is a diagram illustrating an electronic system to which the semiconductor system illustrated in FIGS. 1 to 14 has been applied according to an embodiment of the present disclosure.

As described above, the semiconductor system 2 of the present disclosure can improve operating efficiency of semiconductor devices in a way to perform operations by providing another command to a semiconductor device between times when a write operation is performed on a semiconductor device. The semiconductor system 2 can improve operating efficiency of semiconductor devices by performing a normal operation on the other semiconductor device during the interval in which a read modify operation is performed on one semiconductor device, FIG. 15 is a block diagram illustrating an electronic system 1000 according to an embodiment of the present disclosure. As illustrated in FIG. 15, the electronic system 1000 may include a host 1100 and a semiconductor system 1200.

The host 1100 and the semiconductor system 1200 may mutually transmit signals by using an interface protocol. The interface protocol that is used between the host 1100 and the semiconductor system 1200 may include a multi-media card (MMC), an enhanced small disk interface (ESDI), integrated drive electronics (IDE), peripheral component interconnect—express (PCI-E), advanced technology attachment (ATA), serial ATA (SATA), parallel ATA (DATA), a serial attached SCSI (SAS), a universal serial bus (USB), etc.

The semiconductor system 1200 may include a controller 1300 and semiconductor devices 1400(1:K). The controller 1300 may control the semiconductor devices 1400(1:K) so that the semiconductor devices 1400(1:K) perform a read modify write operation and a normal operation. Each of the semiconductor devices 1400(1:K) may perform a read operation N times and a write operation once in the read modify write operation, and may store parities and write data that are generated by performing an ECC operation based on internal data that is output during the read operation in the read modify write operation and write data that is input during the write operation in the read modify write operation. Each of the semiconductor devices 1400(1:K) may output, to the controller 1300, the internal data that is output in the read operation that has been performed N times in the read modify write operation by serializing the internal data.

The semiconductor system 1200 may perform a read modify write operation when multiple addresses for performing a read operation of the semiconductor devices 1400(1:K) have a logic level combination for selecting contiguous regions. The semiconductor system 1200 can improve operating efficiency of the semiconductor devices 1400(1:K) in a way to perform operations by providing another command to the semiconductor devices 1400(1: K) between times when a write operation is performed on the semiconductor devices 1400(1:K). The semiconductor system 2 can improve operating efficiency of the semiconductor devices 1400(1:K) by performing a normal operation on the other semiconductor device during the interval in which a read modify operation is performed on one semiconductor device.

The controller 1300 may be implemented as the controller 10 illustrated in FIG. 1 and the controller 50 illustrated in FIG. 12, Each of the semiconductor devices 1400(1:K) may be implemented as the semiconductor device 30 illustrated in FIG. 1 and the first semiconductor device 70 and the second semiconductor device 90 that are illustrated in FIG. 12. In some embodiments, each of the semiconductor devices 1400(1:K) may be implemented as one of a dynamic random access memory (DRAM), a phase change random access memory (PRAM), a resistive random access memory (RRAM), a magnetic random access memory (MRAM), and a ferroelectric random access memory (FRAM).

The embodiments of the present disclosure have been described in the drawings and specification. Although specific terminologies are used here, those are only to describe the embodiments of the present disclosure, Therefore, the present disclosure is not restricted to the above-described embodiments and many variations are possible within the spirit and scope of the present disclosure. It should be apparent to those skilled in the art that various modifications can be made on the is basis of the technological scope of the present disclosure in addition to the embodiments disclosed herein and the following claims. Furthermore, the embodiments may be combined to form additional embodiments.

What is claimed is:

1. A semiconductor system comprising:
a controller configured to:
output a command and multiple addresses for performing a read modify write operation when the multiple addresses for performing a read operation have a logic level combination for selecting contiguous regions, and
output first data for performing a write operation; and
a semiconductor device configured to:
store, as write data, the first data for performing the write operation based on the command,
output internal data from a core circuit as the read operation is consecutively performed based on the command and the multiple addresses,
generate parities by performing an error correction code (ECC) operation based on the internal data and the write data, and
store the write data and the parities in the core circuit.

2. The semiconductor system of claim 1, wherein the read modify write operation includes performing the write operation after consecutively performing the read operation.

3. The semiconductor system of claim 1, wherein:
the semiconductor device is further configured to output, as second data, the internal data that is output as the read operation is consecutively performed by serializing the internal data, and
the controller is further configured to receive the second data that is output by the semiconductor device.

4. The semiconductor system of claim 1, wherein the controller comprises:
a queuing circuit configured to output multiple read addresses for the read operation and a write address for performing the write operation;
an address generation circuit configured to:
generate a read write entry signal that is enabled when the multiple read addresses for performing the read operation have the logic level combination for selecting contiguous regions,
sequentially output the multiple read addresses for performing the read operation as the multiple addresses, and
output the write address for performing the write operation as one of the multiple addresses;
a command generation circuit configured to generate the command for performing the read modify write operation when the read write entry signal is enabled; and
a data input/output circuit configured to output the first data, and receive a second data.

5. The semiconductor system of claim 4, wherein the address generation circuit comprises:
a read address comparison circuit configured to generate a read bank detection signal, a read row detection signal, a read-contiguous signal, a data-consecutive signal, and a smallest address signal by comparing the multiple read addresses for performing the read operation;

a write address comparison circuit configured to generate a write bank detection signal, a write row detection signal, and a matching signal by comparing the multiple read addresses for performing the read operation and the write address for performing the write operation; and an address control circuit configured to:
generate the read write entry signal based on the read bank detection signal, the read row detection signal, the read-contiguous signal, the data-consecutive signal, the smallest address signal, the write bank detection signal, and the write row detection signal,
generate the address from the multiple read addresses during the read operation, and
generate the address based on the matching signal and the write address during the write operation.

6. The semiconductor system of claim 5, wherein the read address comparison circuit comprises:
a read bank detection circuit configured to generate the read bank detection signal that is enabled when logic level combinations of a first group of bits that are included in the multiple read addresses are identical;
a read row detection circuit configured to generate the read row detection signal that is enabled when logic level combinations of a second group of bits that are included in the multiple read addresses are identical;
a read-contiguous detection circuit configured to generate the read-contiguous signal that is enabled when logic level combinations of a third group of bits that are included in the multiple read addresses have a logic level combination for selecting contiguous regions;
a data-consecutive signal generation circuit configured to generate the data-consecutive signal that is enabled when the read operation is capable of being consecutively performed on the multiple read addresses; and
a smallest address signal generation circuit configured to generate the smallest address signal that is enabled by detecting a smallest read address among the multiple read addresses.

7. The semiconductor system of claim 5, wherein the write address comparison circuit comprises:
a write bank detection circuit configured to generate the write bank detection signal that is enabled when logic level combinations of a first group of bits that are included in the multiple read addresses and the write address are identical;
a write row detection circuit configured to generate the write row detection signal that is enabled when logic level combinations of a second group of bits that are included in the multiple read addresses and the write address are identical; and
a matching signal generation circuit configured to generate the matching signal that is enabled when logic level combinations of one of the multiple read addresses and the write address are identical.

8. The semiconductor system of claim 5, wherein the address control circuit comprises:
a read write entry signal generation circuit configured to generate the read write entry signal that is enabled when all of the read bank detection signal, the read row detection signal, the read-contiguous signal, the data-consecutive signal, the write bank detection signal, the write row detection signal, and the matching signal are enabled; and an address output circuit configured to:
generate the address from the multiple read addresses when a read enable signal is enabled during the read operation, and
generate the address from the write address when a write enable signal and the smallest address signal are enabled during the write operation.

9. The semiconductor system of claim 1, wherein the semiconductor device comprises:
a command decoder configured to:
generate a write signal after consecutively generating a read signal when the logic level combination of the command is a logic level combination for performing the read modify write operation, and
generate a read write enable signal;
an address decoder configured to generate a bank address, a row address, and a column address based on the multiple addresses;
a data storage circuit configured to:
store, as the write data, internal data that is generated from the first data when the read write enable signal is enabled, and
output the write data that has been stored in the data storage circuit when a storage completion signal is enabled;
the core circuit configured to:
output the internal data that has been stored in a region that is selected based on the bank address, the row address, and the column address when the read signal is enabled, and
store the write data and the parities in a region that is selected based on the bank address, the row address, and the column address when the write signal is enabled;
a data processing circuit configured to:
output the first data as the internal data during the write operation, and
output error-corrected data as the second data during the read operation; and
an error correction circuit configured to:
sequentially store the internal data,
generate the parities by performing the ECC operation on the internal data and the write data that have been stored when the storage completion signal is enabled, and
output, as the error-corrected data, the internal data that has been stored during the read operation by serializing the internal data.

10. The semiconductor system of claim 9, wherein:
the data processing circuit is configured to output, to a local line and as the internal data, the first data that is input through a global line during the write operation, and
the data processing circuit is configured to output, as the second data, the error-corrected data to the global line during the read operation.

11. The semiconductor system of claim 9, wherein the error correction circuit comprises:
a latch data generation circuit configured to generate latch data by sequentially latching the internal data during the read operation;
a parity generation circuit configured to generate the parities by performing the ECC operation on the latch data and the write data when the storage completion signal is enabled; and an error-corrected data generation circuit configured to generate the error-corrected data from the latch data when the read write enable signal is enabled during the read operation.

12. A semiconductor system comprising:
   a controller configured to:
      output a command and first and second addresses for performing a read modify write operation when the first and second addresses have a logic level combination for selecting contiguous regions, and
      output first data; and
   a semiconductor device configured to:
      store, as write data, the first data in a data storage circuit during the read modify write operation based on the command,
      output second internal data that has been stored in at least a memory cell of a core circuit that is selected based on the command and the second address after outputting first internal data that has been stored in at least a memory cell of the core circuit that is selected based on the command and the first address,
      generate parities by performing an error correction code (ECC) operation based on the first and second internal data and the write data, and
      store the write data and the parities in at least a memory cell of the core circuit that is selected by the first address.

13. The semiconductor system of claim 12, wherein the read modify write operation includes performing a write operation after consecutively performing a read operation.

14. The semiconductor system of claim 12, wherein:
   the semiconductor device is further configured to output, as second data, the first and second internal data, which are output as a read operation is consecutively performed, by serializing the first and second internal data, and
   the controller is further configured to receive the second data that is output by the semiconductor device.

15. The semiconductor system of claim 12, wherein the controller comprises:
   a queuing circuit configured to output first and second read addresses for a read operation and a write address for performing a write operation;
   an address generation circuit configured to:
      generate a read write entry signal that is enabled when the first and second read addresses for performing the read operation have the logic level combination for selecting contiguous regions,
      sequentially output the first and second read addresses for performing the read operation as the first and second addresses, and
      output the write address for performing the write operation as the first address;
   a command generation circuit configured to generate the command for performing the read modify write operation when the read write entry signal is enabled; and
   a data input/output circuit configured to output the first data and receive a second data.

16. The semiconductor system of claim 15, wherein the address generation circuit comprises:
   a read address comparison circuit configured to generate a read bank detection signal, a read row detection signal, a read-contiguous signal, a data-consecutive signal, and a smallest address signal by comparing the first and second read addresses for performing the read operation;
   a write address comparison circuit configured to generate a write bank detection signal, a write row detection signal, and a matching signal by comparing the first and second read addresses for performing the read operation and the write address for performing the write operation; and
   an address control circuit configured to:
      generate the read write entry signal based on the read bank detection signal, the read row detection signal, the read-contiguous signal, the data-consecutive signal, the smallest address signal, the write bank detection signal, and the write row detection signal,
      generate the address from the first and second read addresses during the read operation, and
      generate the first address based on the matching signal and the write address during the write operation.

17. The semiconductor system of claim 16, wherein the read address comparison circuit comprises:
   a read bank detection circuit configured to generate the read bank detection signal that is enabled when logic level combinations of a first group of bits that are included in the first and second read addresses are identical;
   a read row detection circuit configured to generate the read row detection signal that is enabled when logic level combinations of a second group of bits that are included in the first and second read addresses are identical;
   a read-contiguous detection circuit configured to generate the read-contiguous signal that is enabled when logic level combinations of a third group of bits that are included in the first and second read addresses have a logic level combination for selecting contiguous regions;
   a data-consecutive signal generation circuit configured to generate the data-consecutive signal that is enabled when the read operation is capable of being consecutively performed on the first and second read addresses; and
   a smallest address signal generation circuit configured to generate the smallest address signal that is enabled by detecting the first read address.

18. The semiconductor system of claim 16, wherein the write address comparison circuit comprises:
   a write bank detection circuit configured to generate the write bank detection signal that is enabled when logic level combinations of a first group of bits that are included in the first and second read addresses and the write address are identical;
   a write row detection circuit configured to generate the write row detection signal that is enabled when logic level combinations of a second group of bits that are included in the first and second read addresses and the write address are identical; and
   a matching signal generation circuit configured to generate the matching signal that is enabled when logic level combinations of the first read address and the write address are identical.

19. The semiconductor system of claim 16, wherein the address control circuit comprises:
   a read write entry signal generation circuit configured to generate the read write entry signal that is enabled when all of the read bank detection signal, the read row detection signal, the read-contiguous signal, the data-consecutive signal, the write bank detection signal, the write row detection signal, and the matching signal are enabled; and an address output circuit configured to:
    generate the first and second addresses from the first and second read addresses when a read enable signal is enabled during the read operation, and
    generate the first address from the write address when a write enable signal and the smallest address signal are enabled during the write operation.

20. The semiconductor system of claim 12, wherein the semiconductor device comprises:
a command decoder configured to:
    generate a write signal after consecutively generating a read signal when the logic level combination of the command is a logic level combination for performing the read modify write operation, and
    generate a read write enable signal;
an address decoder configured to generate a bank address, a row address, and a column address based on the first and second addresses;
a data storage circuit configured to:
    store, as the write data, third internal data that is generated from the first data when the read write enable signal is enabled, and
    output the write data that has been stored in the data storage circuit when a storage completion signal is enabled;
the core circuit configured to:
    output the second internal data after outputting the first internal data that has been stored in at least the memory cell that is selected based on the bank address, the row address, and the column address when the read signal is enabled, and
    store the write data and the parities in at least the memory cell that is selected based on the bank address, the row address, and the column address when the write signal is enabled;
a data processing circuit configured to:
    output the first data as the third internal data during the write operation, and
    output error-corrected data as the second data during the read operation; and
an error correction circuit configured to:
    sequentially store the first and second internal data,
    generate the parities by performing the ECC operation on the first and second internal data and the write data that have been stored when the storage completion signal is enabled, and
    output, as the error-corrected data, the first and second internal data that have been stored during the read operation by serializing the first and second internal data.

21. The semiconductor system of claim 20, wherein:
the data processing circuit is configured to output, to a local line and as the third internal data, the first data that is input through a global line during the write operation, and
the data processing circuit is configured to output, as the second data, the error-corrected data to the global line during the read operation.

22. The semiconductor system of claim 20, wherein the error correction circuit comprises:
a latch data generation circuit configured to generate latch data by sequentially latching the first and second internal data during the read operation;
a parity generation circuit configured to generate the parities by performing the ECC operation on the latch data and the write data when the storage completion signal is enabled; and
an error-corrected data generation circuit configured to generate the error-corrected data from the latch data when the read write enable signal is enabled during the read operation.

23. A semiconductor system comprising:
a controller configured to:
    output first and second chip selection signals, a command address, and first data, and
    receive second and third data;
a first semiconductor device configured to:
    perform a read modify write operation based on a logic level combination of the command address when the first chip selection signal is enabled,
    store the first data as write data,
    output first and second internal data that have been stored in at least a memory cell that is selected by the command address in a read operation of the read modify write operation,
    generate a first parity by performing an error correction code (ECC) operation based on the first and second internal data and the write data,
    store the write data and the first parity in a write operation of the read modify write operation, and
    output the first and second internal data as the second data by serializing the first and second internal data; and
a second semiconductor device configured to:
    perform a normal operation based on a logic level combination of the command address when the second chip selection signal is enabled,
    store third internal data that is generated from the first data in at least a memory cell that is selected by the command address in a write operation of the normal operation, and
    output fourth internal data as the third data by correcting an error of the fourth internal data based on the fourth internal data and a second parity that have been stored in at least a memory cell that is selected by the command address in a read operation of the normal operation.

24. An operating method of a memory apparatus, the operating method comprising:
consecutively reading, in response to a read-modify-write (RMW) command, a sequence of data pieces respectively from neighboring memory cell regions indicated by respective addresses provided together with the RMW command, the memory cell regions being within the memory apparatus; and
storing, at least in a part of the regions, write data together with parity data that is generated on a basis of the write data and the data pieces, the write data being provided together with the RMW command,
wherein, the respective addresses for performing a read operation have a logic level combination for selecting the neighboring memory cell regions.

25. The operating method of claim 24, further comprising performing, during the consecutive reading, another operation in response to another command.

* * * * *